US012120671B2

(12) United States Patent
Wu et al.

(10) Patent No.: US 12,120,671 B2
(45) Date of Patent: Oct. 15, 2024

(54) METHOD AND DEVICE FOR USE IN USER DEVICE AND BASE STATION USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 361 days.

(21) Appl. No.: 17/472,700

(22) Filed: Sep. 13, 2021

(65) Prior Publication Data
US 2022/0046674 A1 Feb. 10, 2022

Related U.S. Application Data

(63) Continuation of application No. PCT/CN2020/077000, filed on Feb. 27, 2020.

(30) Foreign Application Priority Data

Mar. 14, 2019 (CN) .......................... 201910193082.9

(51) Int. Cl.
H04W 72/12 (2023.01)
H04W 72/0446 (2023.01)
(Continued)

(52) U.S. Cl.
CPC ... *H04W 72/1268* (2013.01); *H04W 72/0446* (2013.01); *H04W 72/23* (2023.01); *H04L 5/0005* (2013.01)

(58) Field of Classification Search
CPC ..... H04W 72/12; H04W 72/04; H04W 76/14; H04W 76/15; H04W 84/12; H04W 84/20;
(Continued)

(56) References Cited

U.S. PATENT DOCUMENTS 7,583,939 B2 * 9/2009 Mehta ..................... H04L 5/023
375/267
10,484,067 B2 * 11/2019 Zhang ................... H04L 1/1896
(Continued)

FOREIGN PATENT DOCUMENTS

| CN | 101867981 A | 10/2010 |
| CN | 102612090 A | 7/2012 |

(Continued)

OTHER PUBLICATIONS

ISR received in application No. PCT/CN2020/077000 dated May 27, 2020.
(Continued)

*Primary Examiner* — Man U Phan

(57) ABSTRACT

The present disclosure provides a method and a device in a UE and a base station used for wireless communications. A UE receives first information, the first information is used to determine a first time-frequency resource and a first parameter group; receives a first signaling, the first signaling is used to determine a second time-frequency resource and a second parameter group; operates a first radio signal in the first time-frequency resource; and operates a second radio signal in the second time-frequency resource. A start time for transmitting the first signaling is later than a start time for transmitting the first information; the second parameter group is used to generate the second radio signal, a target parameter group is used to generate the first radio signal, and the target parameter group is the first parameter group or the second parameter group.

16 Claims, 7 Drawing Sheets

(51) Int. Cl.
*H04W 72/1268* (2023.01)
*H04W 72/23* (2023.01)
*H04L 5/00* (2006.01)

(58) Field of Classification Search
CPC ..... H04W 88/04; H04W 88/12; H04W 88/06; H04W 88/10; H04W 16/06; H04L 1/00; H04L 5/00; H04L 1/16; H04L 12/28; H04L 27/26; G06F 3/12
USPC .......................................... 370/329
See application file for complete search history.

(56) References Cited

U.S. PATENT DOCUMENTS

| | | | | |
|---|---|---|---|---|
| 10,582,552 | B2* | 3/2020 | Kim | H04W 72/20 |
| 10,624,077 | B2* | 4/2020 | Agiwal | H04W 52/0209 |
| 10,980,032 | B2* | 4/2021 | Xiao | H04W 72/0466 |
| 11,064,460 | B2* | 7/2021 | Chen | H04W 72/1268 |
| 11,109,381 | B2* | 8/2021 | Chen | H04L 5/0053 |
| 11,160,131 | B2* | 10/2021 | Sun | H04W 8/02 |
| 11,224,041 | B2* | 1/2022 | Zhang | H04W 72/0446 |
| 11,343,834 | B2* | 5/2022 | Jiang | H04W 88/06 |
| 11,425,625 | B2* | 8/2022 | Zhang | H04B 7/0413 |
| 11,695,460 | B2* | 7/2023 | Zhang | H04B 7/0617 |
| | | | | 375/262 |
| 11,770,842 | B2* | 9/2023 | Zhang | H04W 72/23 |
| | | | | 370/312 |
| 2008/0051149 | A1 | 2/2008 | Mehta et al. | |
| 2014/0098761 | A1 | 1/2014 | Lee et al. | |
| 2019/0313452 | A1 | 10/2019 | Zhang | |

FOREIGN PATENT DOCUMENTS

| | | |
|---|---|---|
| CN | 103379603 A | 10/2013 |
| CN | 107404369 A | 11/2017 |
| CN | 107896389 A | 4/2018 |
| CN | 108111268 A | 6/2018 |
| CN | 109462462 A | 3/2019 |
| EP | 2882155 A1 | 6/2015 |
| WO | 2018120054 A1 | 7/2018 |

OTHER PUBLICATIONS

CN201910193082.9 Notification to Grant Patent Right for Invention dated Aug. 23, 2021.
CN201910193082.9 First Office Action dated May 7, 2021.
CN201910193082.9 First Search Report dated Apr. 27, 2021.
First Search Report of Chinese patent application No. CN202111018243.4 dated Jan. 29, 2024.
Notification to Grant Patent Right for Invention of Chinese patent application No. CN202111018243.4 dated Feb. 1, 2024.

* cited by examiner

METHOD AND DEVICE FOR USE IN USER DEVICE AND BASE STATION USED FOR WIRELESS COMMUNICATION

CROSS REFERENCE TO RELATED APPLICATIONS

This application is a continuation of International Application No. PCT/CN2020/077000, filed Feb. 27, 2020, claims the priority benefit of Chinese Patent Application No. 201910193082.9, filed on Mar. 14, 2019, the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

In a 5G system, Enhance Mobile Broadband (eMBB) and Ultra Reliable and Low Latency Communication (URLLC) are two typical traffic types. In 3rd Generation Partner Project (3GPP) new radio Release 15, grant free uplink transmission, that is, uplink transmission based on configured grant, has been supported for requirements of low target BLER ($10^{-5}$) and low-delay (1 ms) of URLLC traffic.

For the purpose of supporting URLLC traffics with higher demands, for example, with higher reliability (e.g., a target BLER is $10^{-6}$) or lower delay (e.g., 0.5-1 ms), at the 3GPP Radio Access Network (RAN) #86 Plenary, an enhanced Study Item (SI) of the URLLC of new radio Release 16 was approved at the plenary, where how to achieve lower transmission delay and higher transmission reliability of a Physical Downlink Shared CHannel (PDSCH)/Physical Uplink Shared CHannel (PUSCH) is a research focus.

SUMMARY

Inventors have found through researches that for transmission based on semi-persistent scheduling, dynamic changes of channels and/or interferences may affect reliability of transmissions. How to improve the reliability of the transmissions based on semi-persistent scheduling is a key problem to be studied.

To address the above problem, the present disclosure provides a solution. It should be noted that, in the case of no conflict, the embodiments of the present disclosure and the features in the embodiments may be combined with each other arbitrarily.

The present disclosure discloses a method in a UE for wireless communications, comprising:
receiving first information, the first information being used to determine a first time-frequency resource and a first parameter group;
receiving a first signaling, the first signaling being used to determine a second time-frequency resource and a second parameter group;
operating a first radio signal in the first time-frequency resource; and
operating a second radio signal in the second time-frequency resource;

herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

In one embodiment, a problem to be solved in the present disclosure is: for transmission based on semi-persistent scheduling, dynamic changes of channels and/or interferences may affect reliability of transmission. How to improve the reliability of transmission based on semi-persistent scheduling is a key issue to be studied.

In one embodiment, a problem to be solved in the present disclosure is: for transmission based on semi-persistent scheduling, dynamic changes of channel and/or interferences may affect reliability of transmission. How to dynamically adjust transmission parameters to improve transmission reliability is a key issue to be studied.

In one embodiment, the above method is essential in that a first radio signal is a transmission based on semi-persistent scheduling, such as an uplink transmission based on configured grant and a semi-persistent scheduling transmission; a second radio signal is a transmission based on dynamic scheduling; a first parameter group and a second parameter group are transmitting parameters of a same type, whether a transmitting parameter of a transmission based on semi-persistent scheduling is replaced by a transmitting parameter of a transmission based on dynamic-scheduling is determined according to a first condition set. The advantage of adopting the above method is that the transmitting parameter of the transmission based on semi-persistent scheduling can be adjusted dynamically, while extra dynamic signaling overhead is avoided.

According to one aspect of the present disclosure, the method is characterized in that when at least one condition in the first condition set is not satisfied, the target parameter group is the first parameter group; and when all conditions in the first condition set are satisfied, the target parameter group is the second parameter group.

In one embodiment, advantages of the above method include that if a transmission based on dynamic scheduling meets all conditions in a first condition set, a transmitting parameter of the transmission based on dynamic scheduling is applicable to a transmitting parameter of the transmission based on semi-persistent scheduling, so that the transmitting parameter of the transmission based on semi-persistent scheduling can be dynamically adjusted, thus the dynamic changes of channels and/or interferences can be better adapted, and extra dynamic signaling overhead is avoided.

According to one aspect of the present disclosure, the method is characterized in that the first information carries a first identifier, the first signaling carries a second identifier, and the first identifier is different from the second identifier.

In one embodiment, the above method is essential in that a first identifier indicates that a first radio signal is a transmission based on semi-persistent scheduling, and a second identifier indicates that a second radio signal is a transmission based on dynamic scheduling.

According to one aspect of the present disclosure, the above method is characterized in comprising:
receiving second information;
herein, a start time for transmitting the second information is earlier than a start time for transmitting the first signaling; the second information is used to determine M time windows, and any two of the M time windows are orthogonal, M being a positive integer greater than 1; a first time window comprises time-domain resources occupied by the first time-frequency resource, and the first time window is one of the M time windows.

In one embodiment, the above method is essential in that the M time windows comprise time-domain resources that can be occupied by a transmission based on semi-persistent scheduling.

According to one aspect of the present disclosure, the method is characterized in that a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

According to one aspect of the present disclosure, the above method is characterized in that reference time-domain resources comprise time-domain resources occupied by the first signaling, or, reference time-domain resources comprise time-domain resources occupied by the second time-frequency resource; time-domain resources occupied by the first time-frequency resource are used to determine a target time-domain resource set; and the first condition set comprises that the reference time-domain resources are non-orthogonal to the target time-domain resource set.

According to one aspect of the present disclosure, the above method is characterized in that the target parameter group is the second parameter group, the first signaling is any of K signalings, each of the K signalings satisfies the first condition set, and the first signaling is one of the K signalings whose start time is latest to the first time-frequency resource; K is a positive integer greater than 1.

According to one aspect of the present disclosure, the above method is characterized in comprising:
  receiving K−1 signaling(s); and
  operating K−1 radio signal(s) in K−1 time-frequency resource(s) respectively;
  herein, a start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s); the operating action is transmitting, or the operating action is receiving.

The present disclosure discloses a method in a base station for wireless communications, comprising:
  transmitting first information, the first information being used to determine a first time-frequency resource and a first parameter group;
  transmitting a first signaling, the first signaling being used to determine a second time-frequency resource and a second parameter group;
  executing a first radio signal in the first time-frequency resource; and
  executing a second radio signal in the second time-frequency resource;
  herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the executing action is receiving, or, the executing action is transmitting.

According to one aspect of the present disclosure, the method is characterized in that when at least one condition in the first condition set is not satisfied, the target parameter group is the first parameter group; and when all conditions in the first condition set are satisfied, the target parameter group is the second parameter group.

According to one aspect of the present disclosure, the method is characterized in that the first information carries a first identifier, the first signaling carries a second identifier, and the first identifier is different from the second identifier.

According to one aspect of the present disclosure, the above method is characterized in comprising:
  transmitting second information; and
  herein, a start time for transmitting the second information is earlier than a start time for transmitting the first signaling; the second information is used to determine M time windows, and any two of the M time windows are orthogonal, M being a positive integer greater than 1; a first time window comprises time-domain resources occupied by the first time-frequency resource, and the first time window is one of the M time windows.

According to one aspect of the present disclosure, the method is characterized in that a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

According to one aspect of the present disclosure, the above method is characterized in that reference time-domain resources comprise time-domain resources occupied by the first signaling, or, reference time-domain resources comprise time-domain resources occupied by the second time-frequency resource; time-domain resources occupied by the first time-frequency resource are used to determine a target time-domain resource set; and the first condition set comprises that the reference time-domain resources are non-orthogonal to the target time-domain resource set.

According to one aspect of the present disclosure, the above method is characterized in that the target parameter group is the second parameter group, the first signaling is any of K signalings, each of the K signalings satisfies the first condition set, and the first signaling is one of the K signalings whose start time is latest to the first time-frequency resource; K is a positive integer greater than 1.

According to one aspect of the present disclosure, the above method is characterized in comprising:
  transmitting K−1 signaling(s); and
  executing K−1 radio signal(s) in K−1 time-frequency resource(s) respectively;
  herein, a start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s); the executing action is receiving, or, the executing action is transmitting.

The present disclosure discloses a UE used for wireless communication, comprising:

a first receiver, receiving first information, the first information being used to determine a first time-frequency resource and a first parameter group; receiving a first signaling, the first signaling being used to determine a second time-frequency resource and a second parameter group; and a first transceiver, operating a first radio signal in the first time-frequency resource; and operating a second radio signal in the second time-frequency resource;

herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

The present disclosure discloses a base station used for wireless communications, comprising:

a second transmitter, transmitting first information, the first information being used to determine a first time-frequency resource and a first parameter group; transmitting a first signaling, the first signaling being used to determine a second time-frequency resource and a second parameter group; and a second transceiver, executing a first radio signal in the first time-frequency resource;

and executing a second radio signal in the second time-frequency resource;

herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the executing action is receiving, or, the executing action is transmitting.

In one embodiment, the present disclosure has the following advantages over conventional schemes:

in one embodiment, for transmission based on semi-persistent scheduling, dynamic changes of channels and/or interferences may affect reliability of transmission. The present disclosure puts forward a scheme of how to improve the reliability of transmission based on semi-persistent scheduling.

in one embodiment, for transmission based on semi-persistent scheduling, dynamic changes of channels and/or interferences may affect reliability of transmission. The present disclosure puts forward a scheme of how to dynamically adjust a transmission parameter to improve transmission reliability.

in one embodiment, in the scheme proposed in the present disclosure, the transmitting parameter of the transmission based on semi-persistent scheduling can be adjusted dynamically, while extra dynamic signaling overhead is avoided.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
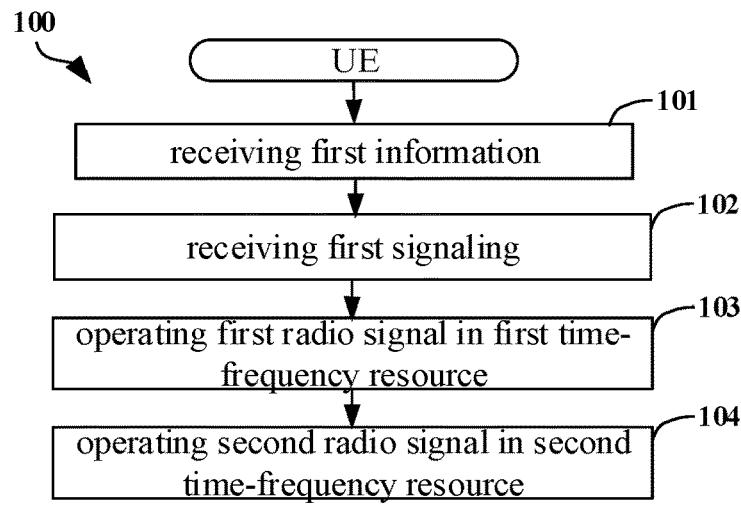
FIG. 1 illustrates a flowchart of first information, a first signaling, a first radio signal and a second radio signal according to one embodiment of the present disclosure.

Embodiment 1 illustrates a flowchart of first information, a first signaling, a first radio signal and a second radio signal, as shown in FIG. 1. In step 100 illustrated by FIG. 1, each box represents a step. And in particular, the order of steps in boxes does not represent chronological order of characteristics between the steps.

In Embodiment 1, the UE in the present disclosure receives first information in step 101, and the first information is used to determine a first time-frequency resource and a first parameter group; receives a first signaling in step 102, the first signaling is used to determine a second time-frequency resource and a second parameter group; operates a first radio signal in the first time-frequency resource in step 103; and operates a second radio signal in the second time-frequency resource in step 104; herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

In one embodiment, the operating action is transmitting.

In one embodiment, the operating action is receiving.

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is carried by a MAC CE signaling.

In one embodiment, the first information comprises one or more Information Elements (IEs) in an RRC signaling.

In one embodiment, the first information comprises all or part of an IE in an RRC signaling.

In one embodiment, the first information comprises partial fields of an IE in an RRC signaling.

In one embodiment, the first information comprises a plurality of IEs in an RRC signaling.

In one embodiment, the operating action is transmitting, the first information comprises part or all of fields of a ConfiguredGrantConfig IE in an RRC signaling, and the specific meaning of the ConfiguredGrantConfig IE can be found in 3GPP TS38.331, section 6.3.2.

In one embodiment, the first information is dynamically configured.

In one embodiment, the first information is carried by a physical-layer signaling.

In one embodiment, the first information is carried by a DCI signaling.

In one embodiment, the operating action is transmitting, the first information is carried by an upLink grant DCI signaling.

In one embodiment, the operating action is receiving, and the first information is carried by a DownLink grant DCI signaling.

In one embodiment, a Cyclic Redundancy Check (CRC) bit sequence of a DCI signaling carrying the first information is scrambled by a Configured Scheduling-Radio Network Temporary Identifier (CS-RNTI).

In one embodiment, the operating action is transmitting, a DCI signaling carrying the first information is DCI format 0_0, and the specific meaning of the DCI format 0_0 can be found in 3GPP TS38.212, section 7.3.1.1.

In one embodiment, the operating action is transmitting, a DCI signaling carrying the first information is DCI format 0_1, and the specific meaning of the DCI format 0_1 can be found in 3GPP TS38.212, section 7.3.1.1.

In one embodiment, the operating action is receiving, a DCI signaling carrying the first information is DCI format 1_0, and the specific meaning of the DCI format 1_0 can be found in 3GPP TS38.212, section 7.3.1.2.

In one embodiment, the operating action is receiving, a DCI signaling carrying the first information is DCI format 1_1, and the specific meaning of the DCI format 1_1 can be found in 3GPP TS38.212, section 7.3.1.2.

In one embodiment, the first information is transmitted on a downlink physical layer control channel (i.e., a downlink channel only capable of carrying a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the first time-frequency resource comprises at least one multicarrier symbol in time domain.

In one embodiment, the first time-frequency resource comprises one or a plurality of consecutive multicarrier symbols in time domain.

In one embodiment, the first time-frequency resource comprises at least one sub-carrier in frequency domain.

In one embodiment, a number of subcarriers comprised in the first time-frequency resource in frequency domain is equal to a positive integral multiple of 12.

In one embodiment, the first time-frequency resource group comprises at least one Resource Block (RB) in frequency domain.

In one embodiment, the second time-frequency resource comprises at least one multicarrier symbol in time domain.

In one embodiment, the second time-frequency resource comprises one or a plurality of consecutive multicarrier symbols in time domain.

In one embodiment, the second time-frequency resource comprises at least one subcarrier in frequency domain.

In one embodiment, a number of subcarriers comprised in the second time-frequency resource in frequency domain is equal to a positive integral multiple of 12.

In one embodiment, the second time-frequency resource comprises at least one RB in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multicarrier (FBMC) symbol.

In one embodiment, the multicarrier symbol comprises a Cyclic Prefix (CP).

In one embodiment, a start time for transmitting the first signaling is later than an end time for transmitting the first information.

In one embodiment, a start time for transmitting the first signaling is earlier than a start time for transmitting the first time-frequency resource.

In one embodiment, an end time for transmitting the first signaling is earlier than a start time for transmitting the first time-frequency resource.

In one embodiment, the first signaling is dynamically configured.

In one embodiment, the first signaling is a physical-layer signaling.

In one embodiment, the first signaling is a DCI signaling.

In one embodiment, the operating action is receiving, and the first signaling is a DownLink Grant DCI signaling.

In one embodiment, the operating action is receiving, and the first signaling is an UpLink Grant DCI signaling.

In one embodiment, a CRC bit sequence of the first signaling is scrambled by a Cell-Radio Network Temporary Identifier (C-RNTI).

In one embodiment, the first signaling is transmitted on a downlink physical layer control channel (i.e., a downlink channel that is only capable of carrying a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one subembodiment of the above embodiment, the downlink physical layer control channel is an NB-PDCCH.

In one embodiment, the first signaling is transmitted on a downlink physical layer data channel (i.e., a downlink channel capable of carrying physical layer data).

In one embodiment, the operating action is receiving, the first signaling is DCI format 1_0, and the specific meaning of the DCI format 1_0 can be found in 3GPP TS38. 212, section 7.3.1.2.

In one embodiment, the operating action is receiving, and the first signaling is DCI format 1_1, and the specific meaning of the DCI format 1_1 can be found in 3GPP TS38. 212, section 7.3.1.2.

In one embodiment, the operating action is transmitting, the first signaling is DCI format 0_0, and the specific meaning of the DCI format 0_0 can be found in 3GPP TS38. 212, section 7.3.1.1.

In one embodiment, the operating action is transmitting, the first signaling is DCI format 0_1, and the specific meaning of the DCI format 0_1 can be found in 3GPP TS38.212, section 7.3.1.1.

In one embodiment, the first information indicates the first time-frequency resource and the first parameter group.

In one embodiment, the first information indicates time-domain resources occupied by the first time-frequency resource, frequency-domain resources occupied by the first time-frequency resource and the first parameter group.

In one subembodiment of the above embodiment, the operating action is transmitting, the first information is carried by an RRC signaling, the first information comprises a timeDomainAllocation field and a frequencyDomainAllocation field in a ConfiguredGrantConfig IE, the timeDomainAllocation field indicates the time-domain resources occupied by the first time-frequency resource, the frequencyDomainAllocation field indicates the frequency-domain resources occupied by the first time-frequency resource, and the specific meanings of the ConfiguredGrantConfig IE, the timeDomainAllocation field and the frequencyDomainAllocation field can be found in 3GPP TS38. 331, section 6.3.2.

In one subembodiment of the above embodiment, the first information is carried by a DCI signaling, the first information comprises a Time domain resource assignment field and a Frequency domain resource assignment field, the Time domain resource assignment field indicates the time-domain resources occupied by the first time-frequency resource, the Frequency domain resource assignment field indicates the frequency-domain resources occupied by the first time-frequency resource, and specific meanings of the Time domain resource assignment field and the Frequency domain resource assignment field can be found in 3GPP TS38. 212, section 7.3.1.

In one subembodiment of the above embodiment, the first information is carried by a DCI signaling, the first parameter group comprises TCI, the first information comprises a Transmission configuration indication field, and the specific meaning of the Transmission configuration indication field can be found in 3GPP TS38. 212, section 7.3.1.

In one subembodiment of the above embodiment, the first information is carried by a DCI signaling, the first parameter group comprises a PMI, the first information comprises a Precoding information and number of layers field, and the specific meaning of the Precoding information and number of layers field can be found in 3GPP TS38. 212, section 7.3.1.

In one subembodiment of the above embodiment, the first parameter group comprises a PMI, the operating action is transmitting, the first information is carried by an RRC signaling, the first information comprises a precodingAndNumberOfLayers field in a ConfiguredGrantConfig IE, and specific meanings of the ConfiguredGrantConfig IE and the precodingAndNumberOfLayers field can be found in 3GPP TS38. 331, section 6.3.2.

In one subembodiment of the above embodiment, the first information is carried by a DCI signaling, the first parameter group comprises an SRI, the first information comprises an SRS resource indicator field, and the specific meaning of the SRS resource indicator can be found in 3GPP TS38. 212, section 7.3.1.

In one subembodiment of the above embodiment, the first parameter group comprises an SRI, the operating action is transmitting, the first information is carried by an RRC signaling, the first information comprises an srs-ResourceIndicator field in a ConfiguredGrantConfig IE, and the specific meanings of the ConfiguredGrantConfig IE and the srs-ResourceIndicator field can be found in 3GPP TS38. 331, section 6.3.2.

In one subembodiment of the above embodiment, the first information is carried by a DCI signaling, the first parameter group comprises an RI, the first information comprises a Precoding information and number of layers field, and the specific meaning of the Precoding information and number of layers field can be found in 3GPP TS38. 212, section 7.3.1.

In one subembodiment of the above embodiment, the first parameter group comprises an RI, the operating action is transmitting, the first information is carried by an RRC signaling, the first information comprises a precodingAndNumberOfLayers field in a ConfiguredGrantConfig IE, and specific meanings of the ConfiguredGrantConfig IE and the precodingAndNumberOfLayers field can be found in 3GPP TS38. 331, section 6.3.2.

In one subembodiment of the above embodiment, the first information is carried by a DCI signaling, the first parameter group comprises an RI, the first information comprises an Antenna port(s) field, and the Antenna port(s) field can be found in 3GPP TS38. 212, section 7.3.1.

In one subembodiment of the above embodiment, the first information is carried by a DCI signaling, the first parameter group comprises an antenna port group, the antenna port group consists of at least one antenna port, the first information comprises an Antenna port(s) field, and the specific meaning of the Antenna port(s) field can be found in 3GPP TS38. 212, section 7.3.1.

In one subembodiment of the above embodiment, the first parameter group comprises an antenna port group, the antenna port group consists of at least one antenna port, the operating action is transmitting, the first information is carried by an RRC signaling, the first information comprises an antennaPort field in a ConfiguredGrantConfig IE, and the specific meanings of the ConfiguredGrantConfig IE and the antennaPort field can be found in 3GPP TS38. 331, section 6.3.2.

In one subembodiment of the above embodiment, the first information is carried by a DCI signaling, the first parameter group comprises an MCS, the first information comprises a Modulation and coding scheme field, and the specific meaning of the Modulation and coding scheme can be found in 3GPP TS38. 212, section 7.3.1.

In one subembodiment of the above embodiment, the first parameter group comprises an MCS, the operating action is transmitting, the first information is carried by an RRC signaling, the first information comprises an mcsAndTBS field in a ConfiguredGrantConfig IE, and the specific meanings of the ConfiguredGrantConfig IE and the mcsAndTBS field can be found in 3GPP TS38. 331, section 6.3.2.

In one embodiment, the first signaling indicates the second time-frequency resource and the second parameter group.

In one embodiment, the first signaling indicates time-domain resources occupied by the second time-frequency resource, frequency-domain resources occupied by the second time-frequency resource and the second parameter group.

In one subembodiment of the above embodiment, the first signaling comprises a Time domain resource assignment field and a Frequency domain resource assignment field, the Time domain resource assignment field indicates the time-domain resources occupied by the first time-frequency resource, the Frequency domain resource assignment field indicates the frequency-domain resources occupied by the first time-frequency resource, and specific meanings of the Time domain resource assignment field and the Frequency domain resource assignment field can be found in 3GPP TS38. 212, section 7.3.1.

In one subembodiment of the above embodiment, the first parameter group comprises a TCI, the first signaling comprises a Transmission configuration indication field, and the specific meaning of the Transmission configuration indication field can be found in 3GPP TS38. 212, section 7.3.1.

In one subembodiment of the above embodiment, the first parameter group comprises a PMI, the first signaling comprises a Precoding information and number of layers field, and the specific meaning of the Precoding information and number of layers field can be found in 3GPP TS38. 212, section 7.3.1.

In one subembodiment of the above embodiment, the first parameter group comprises an SRI, the first signaling comprises an SRS resource indicator field, and the specific meaning of the SRS resource indicator field can be found in 3GPP TS38. 212, section 7.3.1.

In one subembodiment of the above embodiment, the first parameter group comprises an RI, the first signaling comprises a Precoding information and number of layers field, and the specific meaning of the Precoding information and number of layers field can be found in 3GPP TS38. 212, section 7.3.1.

In one subembodiment of the above embodiment, the first parameter group comprises an RI, the first signaling comprises an Antenna port(s) field, and the Antenna port(s) field can be found in 3GPP TS38. 212, section 7.3.1.

In one subembodiment of the above embodiment, the first parameter group comprises an antenna port group, the antenna port group consists of at least one antenna port, the first signaling comprises an Antenna port(s) field, and the specific meaning of the Antenna port(s) field can be found in 3GPP TS38. 212, section 7.3.1.

In one subembodiment of the above embodiment, the first parameter group comprises an MCS, the first signaling comprises a Modulation and coding scheme field, and the specific meaning of the Modulation and coding scheme field can be found in 3GPP TS38. 212, section 7.3.1.

In one embodiment, the first parameter group comprises at least one of a multi-antenna associated transmission, a multi-antenna associated reception, a Transmission configuration indication (TCI), a Precoding Matrix Indicator (PMI), a Sounding Reference Signal Resource Indicator (SRI), a Rank Indicator (RI), a Modulation and Coding Scheme (MCS) or an antenna port group.

In one embodiment, the second parameter group comprises at least one of a multi-antenna associated transmission, a multi-antenna associated reception, a TCI, a PMI, an SRI, an RI, an MCS or an antenna port group; and the second parameter group and the first parameter group comprise parameters of a same type.

In one embodiment, the first parameter group comprises a multi-antenna associated transmission.

In one embodiment, the first parameter group comprises a multi-antenna associated reception.

In one embodiment, the first parameter group comprises a TCI, and the second parameter group comprises a TCI.

In one embodiment, the first parameter group comprises a PMI, and the second parameter group comprises a PMI.

In one embodiment, the first parameter group comprises an SRI, and the second parameter group comprises an SRI.

In one embodiment, the first parameter group comprises an RI, and the second parameter group comprises an RI.

In one embodiment, the first parameter group comprises an MCS, and the second parameter group comprises an MCS.

In one embodiment, the first parameter group comprises an antenna port group, and the second parameter group comprises an antenna port group.

In one embodiment, the antenna port group comprises at least one antenna port.

In one embodiment, the multi-antenna associated reception refers to Spatial Rx parameters.

In one embodiment, the multi-antenna associated reception refers to a receiving beam.

In one embodiment, the multi-antenna associated reception refers to a reception beamforming matrix.

In one embodiment, the multi-antenna associated reception refers to a reception analog beamforming matrix.

In one embodiment, the multi-antenna associated reception refers to a reception analog beamforming vector.

In one embodiment, the multi-antenna associated reception refers to a reception beamforming vector.

In one embodiment, the multi-antenna associated reception refers to reception spatial filtering.

In one embodiment, the multi-antenna associated transmission refers to Spatial Tx parameters.

In one embodiment, the multi-antenna associated transmission refers to a transmission beam.

In one embodiment, the multi-antenna associated transmission refers to a transmission beamforming matrix.

In one embodiment, the multi-antenna associated transmission refers to a transmission analog beamforming matrix.

In one embodiment, the multi-antenna associated transmission refers to a transmission analog beamforming vector.

In one embodiment, the multi-antenna associated transmission refers to a transmission beamforming vector.

In one embodiment, the multi-antenna associated transmission refers to transmission spatial filtering.

In one embodiment, the Spatial Tx parameters comprise one or more of a transmission antenna port, a transmission antenna port group, a transmission beam, a transmission analog beamforming matrix, a transmission analog beamforming vector, a transmission beamforming matrix, a transmission beamforming vector and transmission spatial filtering.

In one embodiment, Spatial Rx parameters comprise one or more of a reception beam, a reception analog beamforming matrix, a reception analog beamforming vector, a reception beamforming matrix, a reception beamforming vector and reception spatial filtering.

In one embodiment, the operating action is transmitting, the first information is carried by an RRC signaling, the first radio signal comprises a type 1 Configured Grant based Physical Uplink Shared CHannel (PUSCH) transmission.

In one embodiment, the operating action is transmitting, the first information is carried by a DCI signaling, and the first radio signal comprises a type 2 Configured Grant based PUSCH transmission.

In one embodiment, the operating action is receiving, the first information is carried by a DCI signaling, and the first radio signal comprises a Semi-persistent scheduling (SPS) PDSCH transmission.

In one embodiment, the first radio signal comprises data.

In one embodiment, the first radio signal comprises data and a reference signal.

In one subembodiment of the above embodiment, the operating action is receiving, the reference signal comprised in the first radio signal comprises at least one of DeModulation Reference Signals (DMRS), a Channel State Information-Reference Signal (CSI-RS), or a Phase-tracking reference signal (PTRS).

In one subembodiment of the above embodiment, the operating action is transmitting, and the reference signal comprised in the first radio signal comprises at least one of DMRS, an SRS or a PTRS.

In one subembodiment of the above embodiment, the reference signal comprised in the first radio signal comprises a DMRS.

In one subembodiment of the above embodiment, the operating action is receiving, and the reference signal comprised in the first radio signal comprises a PT-RS.

In one subembodiment of the above embodiment, the operating action is receiving, and the reference signal comprised in the first radio signal comprises a CSI-RS.

In one subembodiment of the above embodiment, the operating action is transmitting, and the reference signal comprised in the first radio signal comprises an SRS.

In one embodiment, a transmission channel of the first radio signal is a Downlink Shared Channel (DL-SCH).

In one embodiment, the first radio signal is transmitted on a downlink physical layer data channel (i.e., a downlink channel capable of carrying physical layer data).

In one embodiment, the operating action is transmitting, and the second radio signal comprises a scheduled PUSCH transmission.

In one embodiment, the operating action is receiving, and the second radio signal comprises a scheduled PDSCH transmission.

In one embodiment, the second radio signal comprises data.

In one embodiment, the second radio signal comprises data and a reference signal.

In one subembodiment of the above embodiment, the operating action is receiving, and the reference signal comprised in the second radio signal comprises at least one of a DMRS, a CSI-RS or a PTRS.

In one subembodiment of the above embodiment, the operating action is transmitting, and the reference signal comprised in the second radio signal comprises at least one of a DMRS, an SRS or a PTRS.

In one subembodiment of the above embodiment, the reference signal comprised in the second radio signal comprises a DMRS.

In one subembodiment of the above embodiment, the operating action is receiving, and the reference signal comprised in the second radio signal comprises a PT-RS.

In one subembodiment of the above embodiment, the operating action is receiving, and the reference signal comprised in the second radio signal comprises a CSI-RS.

In one subembodiment of the above embodiment, the operating action is transmitting, and the reference signal comprised in the second radio signal comprises an SRS.

In one embodiment, a transmission channel of the second radio signal is a Downlink Shared Channel (DL-SCH).

In one embodiment, the second radio signal is transmitted on a downlink physical layer data channel (i.e., a downlink channel capable of carrying physical layer data).

In one embodiment, the operating action is receiving, the first parameter group comprises a multi-antenna associated reception, and the second parameter group comprises a multi-antenna associated reception; the multi-antenna associated reception comprised in the first parameter group indicates a multi-antenna associated reception of the first radio signal, and the multi-antenna associated reception comprised in the second parameter group indicates a multi-antenna associated reception of the second radio signal.

In one embodiment, the operating action is transmitting, the first parameter group comprises a multi-antenna associated transmission, and the second parameter comprises a multi-antenna associated transmission; the multi-antenna associated transmission comprised in the first parameter group indicates a multi-antenna associated transmission of the first radio signal, and the multi-antenna associated transmission comprised in the second parameter group indicates a multi-antenna associated transmission of the second radio signal.

In one embodiment, the operating action is receiving, the first parameter group comprises a TCI, and the second parameter group comprises a TCI; the TCI comprised in the first parameter group indicates a multi-antenna associated reception of the first radio signal, and the TCI comprised in the second parameter group indicates a multi-antenna associated reception of the second radio signal.

In one embodiment, the first parameter group comprises a PMI, and the second parameter group comprises a PMI; the PMI comprised in the first parameter group indicates a transmitting precoding matrix of the first radio signal, and the PMI comprised in the second parameter group indicates a transmitting precoding matrix of the second radio signal.

In one embodiment, the operating action is transmitting, the first parameter group comprises an SRI, and the second parameter group comprises an SRI; the SRI comprised in the first parameter group indicates a multi-antenna associated transmission of the first radio signal, and the SRI comprised in the second parameter group indicates a multi-antenna associated transmission of the second radio signal.

In one embodiment, the first parameter group comprises an RI, and the second parameter group comprises an RI; the RI comprised in the first parameter group indicates a layer number of the first radio signal, and the RI comprised in the second parameter group indicates a layer number of the second radio signal.

In one embodiment, the first parameter group comprises an MCS, and the second parameter group comprises an MCS; the MCS comprised in the first parameter group indicates a modulation order and a coding rate of the first radio signal, and the MCS comprised in the second parameter group indicates a modulation order and a coding rate of the second radio signal.

In one embodiment, the first parameter group comprises an antenna port group, and the second parameter group comprises an antenna port group; the antenna port group comprised in the first parameter group indicates a transmitting antenna port group of the first radio signal, and the antenna port group comprised in the second parameter group indicates a transmitting antenna port group of the second radio signal.

In one embodiment, the first condition set comprises N condition(s), N being a positive integer.

In one subembodiment of the above embodiment, N is equal to 1.

In one subembodiment of the above embodiment, N is greater than 1.

Embodiment 2

Figure 2:
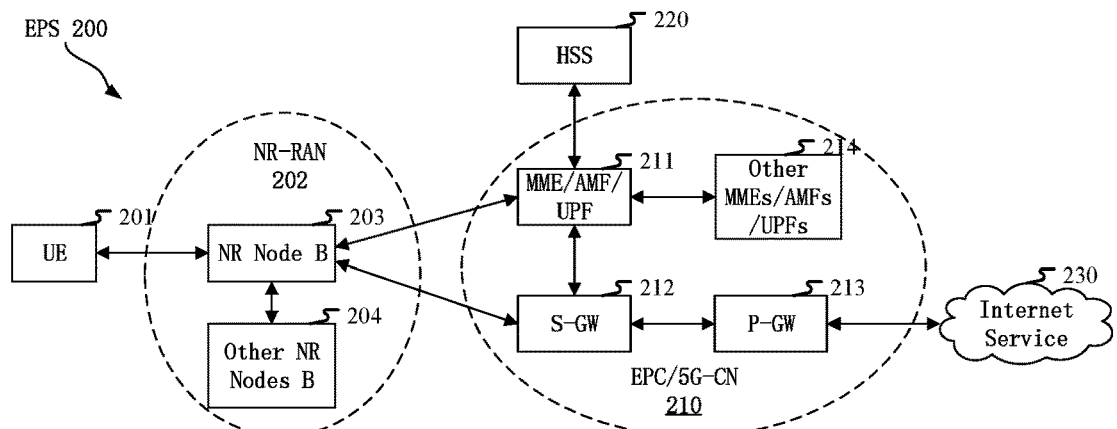
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The NR 5G or LTE network architecture 200 may be called an Evolved Packet System (EPS) 200 or some other applicable terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMEs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services (PSSs).

In one embodiment, the UE 201 corresponds to the UE in the present disclosure.

In one embodiment, the gNB 203 corresponds to the base station in the present disclosure.

In one subembodiment, the UE 201 supports MIMO-based wireless communications.

In one subembodiment, the gNB 203 supports MIMO-based wireless communications.

Embodiment 3

Figure 3:
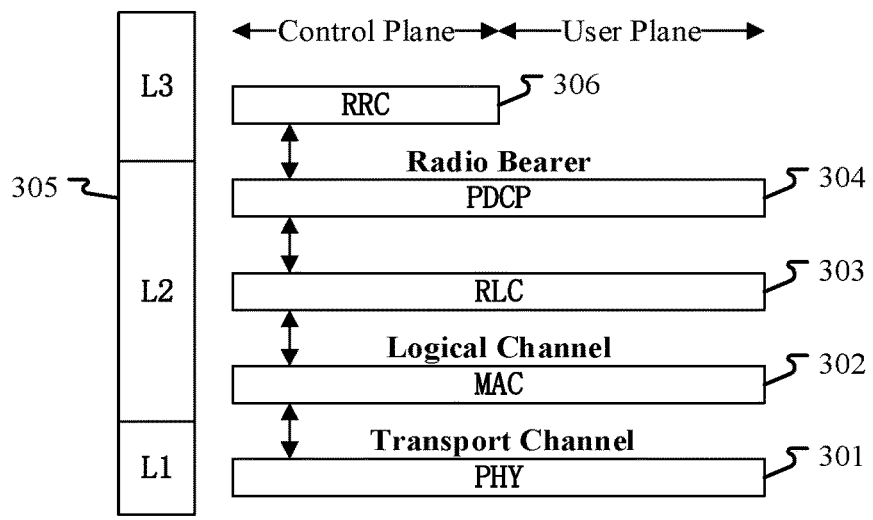
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer data packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a data packet so as to compensate the disordered receiving caused by HARQ. The MAC sublayer 302 provides multi-plexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the second information in the present disclosure is generated by the RRC sublayer 306.

In one embodiment, the second information in the present disclosure is generated by the MAC sublayer 302.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the first signaling in the present disclosure is generated by the PHY 301.

In one embodiment, the K−1 signaling(s) in the present disclosure is(are) generated by the PHY 301.

In one embodiment, the K signalings in the present disclosure are generated by the PHY 301.

In one embodiment, the first radio signal in the present disclosure is generated by the PHY 301.

In one embodiment, the second radio signal in the present disclosure is generated by the PHY 301.

In one embodiment, the K−1 radio signal(s) in the present disclosure is(are) generated by the PHY 301.

Embodiment 4

Figure 4:
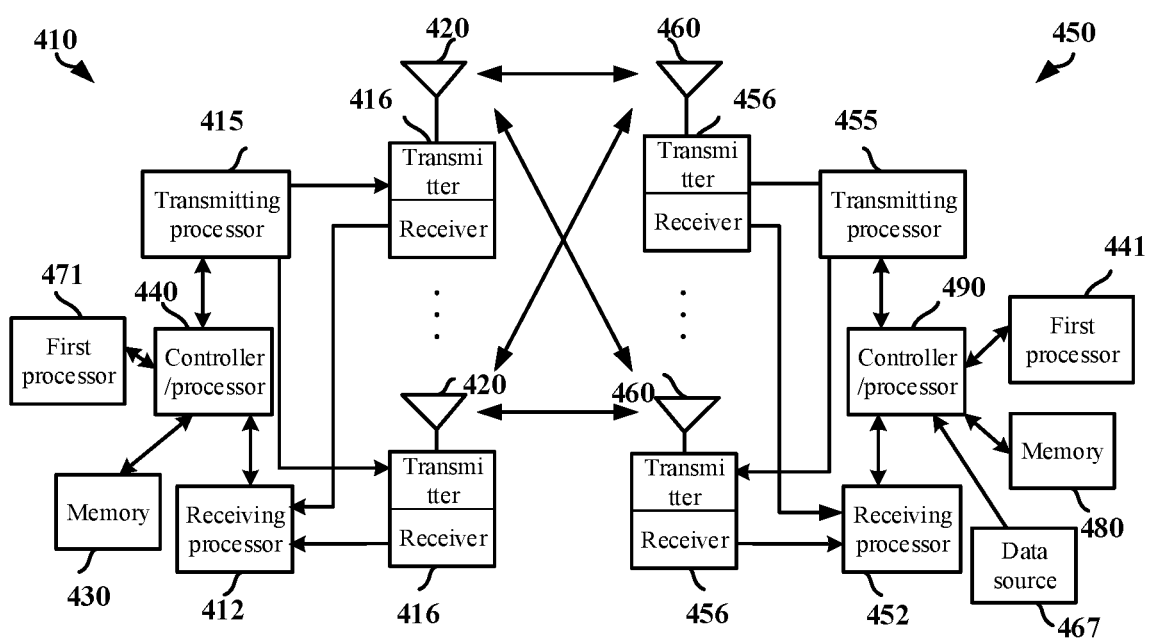
FIG. 4 illustrates a schematic diagram of an NR node and a UE according to one embodiment of the present disclosure.

Embodiment 4 illustrates a schematic diagram of a base station and a UE according to the present disclosure, as shown in FIG. 4. FIG. 4 is a block diagram of a gNB 410 in communication with a UE 450 in an access network.

The base station (410) comprises a controller/processor 440, a memory 430, a receiving processor 412, a first processor 471, a transmitting processor 415, a transmitter/receiver 416 and an antenna 420.

The UE (450) comprises a controller/processor 490, a memory 480, a data source 467, a first processor 441, a transmitting processor 455, a receiving processor 452, a transmitter/receiver 456 and an antenna 460.

In downlink (DL) transmission, processes relevant to the base station (410) include the following:

a higher layer packet is provided to the controller/processor 440, the controller/processor 440 provides header compression, encryption, packet segmentation and reordering, and a multiplexing between a logical channel and a transport channel so as to implement the L2 layer protocols used for the user plane and the control plane; a higher layer packet may include data or control information, such as a Downlink Shared Channel (DL-SCH);

the controller/processor 440 is connected to the memory 430 that stores program codes and data. The memory 430 may be a computer readable medium;

the controller/processor 440 comprises scheduling units for transmission requests, the scheduling units are used for scheduling radio resources corresponding to transmission requests;

the first processor 471, determines transmitting first information and a first signaling;

the first processor 471, determines executing a first radio signal in a first time-frequency resource, executing a second radio signal in a second time-frequency resource, and the executing action is transmitting;

the transmitting processor 415 receives a bit stream output from the controller/processor 440, and performs signal transmitting processing functions of an L1 layer (that is, PHY), including encoding, interleaving, scrambling, modulation, power control/allocation, generation of physical layer control signaling (including PBCH, PDCCH, PHICH, PCFICH, reference signal), etc;

the transmitting processor 415 receives an output bit stream of the controller/processor 440 and implements various signal transmitting and processing functions for the L1 layer (i.e. physical layer), including multi-antenna transmission, spread spectrum, code-division multiplexing, precoding, etc;

the transmitter 416 is configured to convert the baseband signal provided by the transmitting processor 415 into a radio-frequency signal and transmit the radio-frequency signal via the antenna 420; each transmitter 416 performs sampling processing on respective input symbol streams to acquire respective sampled signal streams; each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

the receiver 456 is configured to convert a radio-frequency signal received via the antenna 460 into a baseband signal and provide the baseband signal to the receiving processor 452;

the receiving processor 452 performs signal receiving processing functions of an L1 layer (that is, PHY), including decoding, de-interleaving, descrambling, demodulation, extraction of physical layer control signaling, etc;

the receiving processor 452 implements various signal receiving processing functions for an L1 layer (that is, PHY), including multi-antenna receiving, despreading, code-division multiplexing, precoding, etc;

the first processor 441, determines receiving first information and a first signaling;

the first processor 441 determines operating a first radio signal in a first time-frequency resource, operating a second radio signal in a second time-frequency resource, and the operating action is receiving;

the controller/processor 490 receives a bit stream output from the receiving processor 452, and provides header decompression, decryption, packet segmentation and reordering, multiplexing and de-multiplexing between a logical channel and a transport channel, to implement the L2 protocol used for the user plane and the control plane;

the controller/processor 490 is connected to the memory 480 that stores program code and data. The memory 480 may be called a computer readable medium.

In uplink (UL) transmission, processes relevant to the base station (410) include the following:

the receiver 416 receives a radio frequency signal via a corresponding antenna 420, converts the received radio frequency signal into a baseband signal, and provides the baseband signal to the receiving processor 412;

the receiving processor 412 performs various signal receiving processing functions for L1 (i.e., PHY), including decoding, deinterleaving, descrambling, demodulation and extraction of physical layer control signaling;

the receiving processor 412 implements various signal receiving and processing functions for an L1 layer (that is, PHY), including multi-antenna receiving, despreading, code-division multiplexing, precoding, etc;

the controller/processor 440 implements function of L2 layer, and is connected to the memory 430 that stores program codes and data;

the controller/processor 440 provides demultiplexing between a transport channel and a logical channel, packet reassembling, decryption, header decompression, and controls signal processing to recover a higher layer packet coming from the UE 450; a higher layer packet from the controller/processor 440 can be provided to the core network;

the first processor 471, determines executing a first radio signal in a first time-frequency resource, executing a second radio signal in a second time-frequency resource, and the executing action is receiving;

in UL (Uplink), processes relevant to the UE (450) include the following:

the data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 implements various signal receiving processing functions used for L1 (i.e., PHY), including coding, interleaving, scrambling, modulation and generation of PHY signaling;

the transmitting processor 455 implements various signal receiving and processing functions for an L1 layer (that is, PHY), including multi-antenna transmitting, spreading, code-division multiplexing, precoding, etc;

the controller/processor 490 based on radio resource allocation of the gNB 410 performs header compression, encryption, packet segmentation and reordering and multiplexing between a logical channel and a transport channel, so as to implement the L2 function used for user plane and control plane;

the controller/processor 490 is also in charge of HARQ operation, retransmission of a lost packet, and a signaling of the gNB 410;

the first processor 441 determines operating a first radio signal in a first time-frequency resource, operating a second radio signal in a second time-frequency resource, and the operating action is transmitting;

In one embodiment, the UE 450 comprises at least one processor and at least one memory. at least one processor and at least one memory. The at least one memory comprises computer program codes; the at least one memory and the computer program codes are configured to be used in collaboration with the at least one processor. The UE 450 at least: receives first information, the first information is used to determine a first time-frequency resource and a first parameter group; receives a first signaling, the first signaling is used to determine a second time-frequency resource and a second parameter group; operates a first radio signal in the first time-frequency resource; and operates a second radio signal in the second time-frequency resource; herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

In one embodiment, the UE 450 comprises a memory that stores a computer readable instruction program. The computer readable instruction program generates an action when executed by at least one processor. The action includes: receiving first information, the first information being used to determine a first time-frequency resource and a first parameter group; receiving a first signaling, the first signaling being used to determine a second time-frequency resource and a second parameter group; operating a first radio signal in the first time-frequency resource; and operating a second radio signal in the second time-frequency resource; herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

In one embodiment, the gNB 410 comprises: at least one processor and at least one memory. The at least one memory comprises computer program codes; the at least one memory and the computer program codes are configured to be used in collaboration with the at least one processor. The gNB 410 at least: transmits first information, the first information is used to determine a first time-frequency resource and a first parameter group; transmits a first signaling, the first signaling is used to determine a second time-frequency resource and a second parameter group; executes a first radio signal in the first time-frequency resource; and executes a second radio signal in the second time-frequency resource; herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the executing action is receiving, or, the executing action is transmitting.

In one embodiment, the gNB 410 comprises a memory that stores a computer readable instruction program. The computer readable instruction program generates an action when executed by at least one processor. The action includes: transmitting first information, the first information being used to determine a first time-frequency resource and a first parameter group; transmitting a first signaling, the first signaling being used to determine a second time-frequency resource and a second parameter group; executing a first radio signal in the first time-frequency resource; and executing a second radio signal in the second time-frequency resource; herein, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the executing action is receiving, or, the executing action is transmitting.

In one embodiment, the UE 450 corresponds to the UE in the present disclosure.

In one embodiment, the gNB 410 corresponds to the base station in the present disclosure.

In one embodiment, at least the first three of the receiver 456, the receiving processor 452, the first processor 441, and the controller/processor 490 are used to receive the second information in the present disclosure.

In one embodiment, at least the first three of the transmitter 416, the transmitting processor 415, the first processor 471, and the controller/processor 440 are used to transmit the second information in the present disclosure.

In one embodiment, at least the first three of the receiver 456, the receiving processor 452, the first processor 441, and the controller/processor 490 are used to receive the first information in the present disclosure.

In one embodiment, at least the first three of the transmitter 416, the transmitting processor 415, the first processor 471, and the controller/processor 440 are used to transmit the first information in the present disclosure.

In one embodiment, at least the first three of the receiver 456, the receiving processor 452, the first processor 441, and the controller/processor 490 are used to receive the first radio signal in the present disclosure in the first time-frequency resource in the present disclosure.

In one embodiment, at least the first three of the transmitter 416, the transmitting processor 415, the first processor 471, and the controller/processor 440 are used to transmit the first radio signal in the present disclosure in the first time-frequency resource in the present disclosure.

In one embodiment, at least the first three of the receiver 456, the receiving processor 452, the first processor 441, and the controller/processor 490 are used to receive the K−1 signaling(s) in the present disclosure.

In one embodiment, at least the first three of the transmitter 416, the transmitting processor 415, the first processor 471, and the controller/processor 440 are used to transmit the K−1 signaling(s) in the present disclosure.

In one embodiment, at least the first three of the receiver 456, the receiving processor 452, the first processor 441, and the controller/processor 490 are used to receive the first signaling in the present disclosure.

In one embodiment, at least the first three of the transmitter 416, the transmitting processor 415, the first processor 471, and the controller/processor 440 are used to transmit the first signaling in the present disclosure.

In one embodiment, at least the first three of the receiver 456, the receiving processor 452, the first processor 441, and the controller/processor 490 are used to receive the K−1 radio signal(s) in the present disclosure in the K−1 time-frequency resource(s) in the present disclosure respectively.

In one embodiment, at least the first three of the transmitter 416, the transmitting processor 415, the first processor 471, and the controller/processor 440 are used to transmit the K−1 radio signal(s) in the present disclosure in the K−1 time-frequency resource(s) in the present disclosure respectively.

In one embodiment, at least the first three of the receiver 456, the receiving processor 452, the first processor 441 and the controller/processor 490 are used to receive the first radio signal in the present disclosure in the first time-frequency resource in the present disclosure.

In one embodiment, at least the first three of the transmitter 416, the transmitting processor 415, the first processor 471, and the controller/processor 440 are used to transmit the first radio signal in the present disclosure in the first time-frequency resource in the present disclosure.

In one embodiment, at least the first three of the receiver 456, the receiving processor 452, the first processor 441 and the controller/processor 490 are used to receive the second radio signal in the present disclosure in the second time-frequency resource in the present disclosure.

In one embodiment, at least the first three of the transmitter 416, the transmitting processor 415, the first processor 471, and the controller/processor 440 are used to transmit the second radio signal in the present disclosure in the second time-frequency resource in the present disclosure.

In one embodiment, at least first two of the transmitter 456, the transmitting processor 455 and the controller/processor 490 are used to transmit the first radio signal in the present disclosure in the first time-frequency resource in the present disclosure.

In one embodiment, at least the first two of the receiver 416, the receiving processor 412 and the controller/processor 440 are used to receive the first radio signal in the present disclosure in the first time-frequency resource in the present disclosure.

In one embodiment, at least first two of the transmitter 456, the transmitting processor 455 and the controller/processor 490 are used to transmit the second radio signal in the present disclosure in the second time-frequency resource in the present disclosure.

In one embodiment, at least the first two of the receiver 416, the receiving processor 412 and the controller/processor 440 are used to receive the second radio signal in the present disclosure in the second time-frequency resource in the present disclosure.

In one embodiment, at least the first two of the transmitter 456, the transmitting processor 455 and the controller/processor 490 are used to transmit the K−1 signaling(s) in the present disclosure.

In one embodiment, at least the first two of the receiver 416, the receiving processor 412 and the controller/processor 440 are used to receive the K−1 signaling(s) in the present disclosure.

In one embodiment, at least the first two of the transmitter 456, the transmitting processor 455 and the controller/processor 490 are used to transmit the first signaling in the present disclosure.

In one embodiment, at least the first two of the receiver 416, the receiving processor 412 and the controller/processor 440 are used to receive the first signaling in the present disclosure.

In one embodiment, at least first two of the transmitter 456, the transmitting processor 455 and the controller/processor 490 are used to transmit the K−1 radio signal(s) in the present disclosure in the K−1 time-frequency resource(s) in the present disclosure respectively.

In one embodiment, at least the first two of the receiver 416, the receiving processor 412 and the controller/processor 440 are used to receive the K−1 radio signal(s) in the present disclosure in the K−1 time-frequency resource(s) in the present disclosure respectively.

Embodiment 5

Figure 5:
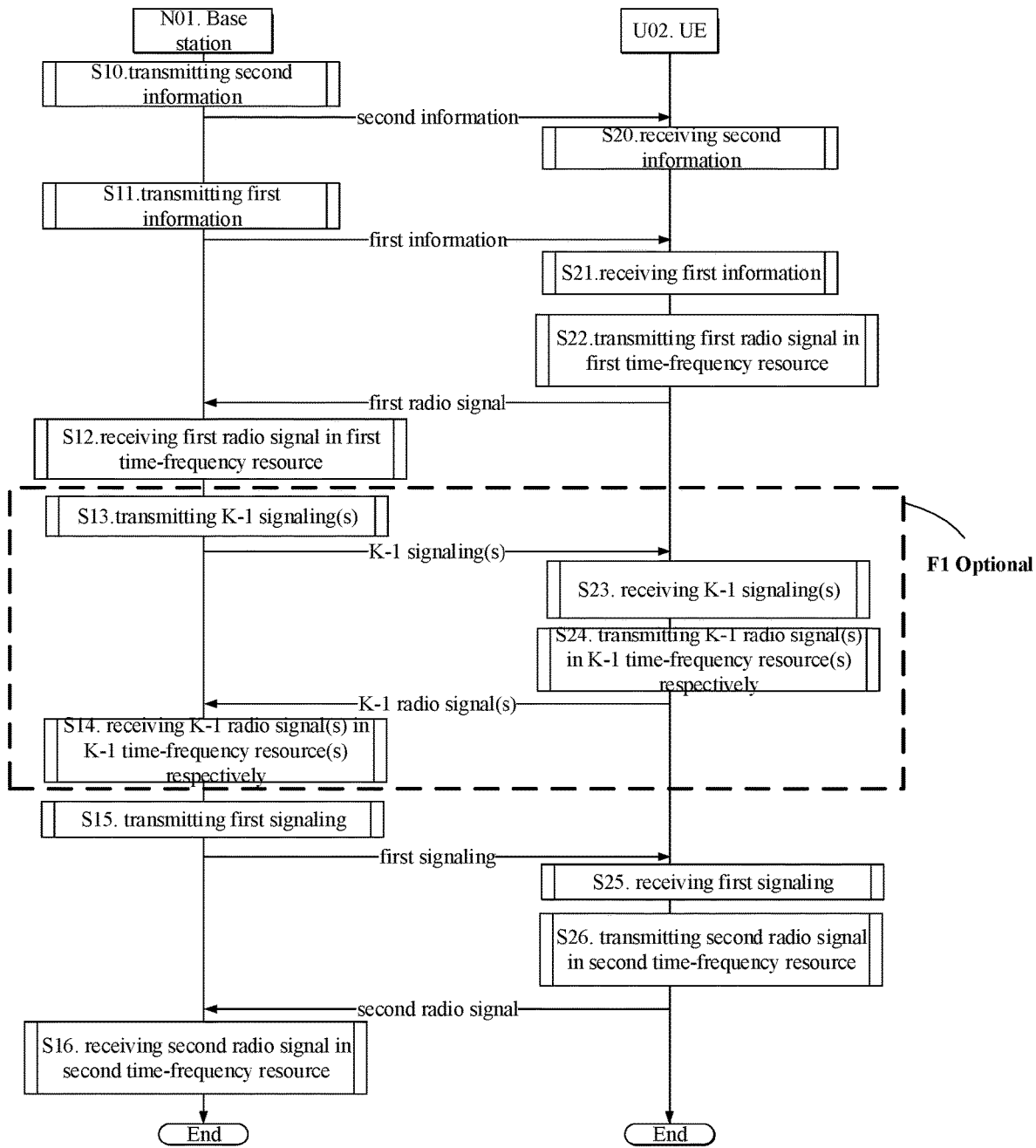
FIG. 5 illustrates a flowchart of wireless transmissions according to one embodiment of the present disclosure.

Embodiment 5 illustrates a flowchart of wireless transmissions, as shown in FIG. 5. In FIG. 5, a base station N01 is a maintenance base station for a serving cell of a UE U02. In FIG. 5, the block marked by F1 is optional.

The N01 transmits second information in step S10; transmits first information in step S11; receives a first radio signal in a first time-frequency resource in step S12; transmits K−1 signaling(s) in step S13; receives K−1 radio signal(s) in K−1 time-frequency resource(s) respectively in step S14; transmits a first signaling in step S15; and receives a second radio signal in a second time-frequency resource in step S16.

The U02 receives second information in step S20; receives first information in step S21; transmits a first radio signal in a first time-frequency resource in step S22; receives K−1 signaling(s) in step S23; transmits K−1 radio signal(s) in K−1 time-frequency resource(s) respectively in step S24; receives a first signaling in step S25; and transmits a second radio signal in a second time-frequency resource in step S26.

In embodiment 5, the operating action in the present disclosure is transmitting, and the executing action in the present disclosure is receiving; the first information is used by the U02 to determine a first time-frequency resource and a first parameter group; the first signaling is used by the U02 to determine a second time-frequency resource and a second parameter group; a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group. A start time for transmitting the second information is earlier than a start time for transmitting the first signaling; the second information is used by the U02 to determine M time windows, and any two of the M time windows are orthogonal, M being a positive integer greater than 1; a first time window comprises time-domain resources occupied by the first time-frequency resource, and the first time window is one of the M time windows. A start time for transmitting each of the K signalings is later than a start time for transmitting the first information; the K signalings are respectively used by the U02 to determine K time-frequency resources, and the K signalings are respectively used by the U02 to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s).

In one embodiment, the second information is semi-statically configured.

In one embodiment, the second information is carried by a higher layer signaling.

In one embodiment, the second information is carried by an RRC signaling.

In one embodiment, the second information is carried by a MAC CE signaling.

In one embodiment, the second information comprises one or more IEs of an RRC signaling.

In one embodiment, the second information comprises all or part of an IE in an RRC signaling.

In one embodiment, the second information comprises partial fields of an IE in an RRC signaling.

In one embodiment, the second information comprises a plurality of IEs in an RRC signaling.

In one embodiment, the operating action is transmitting, the second information comprises part or all of fields of a ConfiguredGrantConfig IE in an RRC signaling, and the specific meaning of the ConfiguredGrantConfig IE can be found in 3GPP TS38.331, section 6.3.2.

In one embodiment, the operating action is receiving, the second information comprises part or all of fields of an SPS-Config IE in an RRC signaling, and the specific meaning of the SPS-Config IE can be found in 3GPP TS38.331, section 6.3.2.

In one embodiment, the second information explicitly indicates the M time windows.

In one embodiment, the second information implicitly indicates the M time windows.

In one embodiment, the second information indicates a period and a time-domain offset, and the period and the time-domain offset are used by the U02 to determine the M time windows.

In one subembodiment of the above embodiment, the period is a time gap between any two adjacent time windows of the M time windows.

In one subembodiment of the above embodiment, a time gap between any two of the M time windows is a positive integral multiple of the period.

In one subembodiment of the above embodiment, the period is measured by millisecond.

In one subembodiment of the above embodiment, the period is measured by time-domain unit.

In one subembodiment of the above embodiment, the time-domain offset indicates an earliest time window of the M time windows.

In one subembodiment of the above embodiment, the time-domain offset is measured by millisecond.

In one subembodiment of the above embodiment, the time-domain offset is measured by time-domain unit.

In one subembodiment of the above embodiment, the second information comprises a periodicity field and a timeDomainOffset field in a ConfiguredGrantConfig IE in an RRC signaling, the periodicity field indicates the period, the timeDomainOffset field indicates the time-domain offset, and the specific meaning of the ConfiguredGrantConfig IE can be found in 3GPP TS38. 331, section 6.3.2.

In one embodiment, the second information indicates a period, the first information also indicates a time-domain offset, and the period and the time-domain offset are used by the U02 to determine the M time windows.

In one subembodiment of the above embodiment, the period is a time gap between any two adjacent time windows of the M time windows.

In one subembodiment of the above embodiment, a time gap between any two of the M time windows is a positive integral multiple of the period.

In one subembodiment of the above embodiment, the period is measured by millisecond.

In one subembodiment of the above embodiment, the period is measured by time-domain unit.

In one subembodiment of the above embodiment, the second information comprises a Periodicity field in an SPS-Config IE in an RRC signaling, and the specific meaning of the SPS-Config IE can be found in 3GPP TS38.331, section 6.3.2.

In one subembodiment of the above embodiment, the second information comprises a periodicity field in a ConfiguredGrantConfig IE in an RRC signaling, the periodicity field indicates the period, and the specific meaning of the ConfiguredGrantConfig IE can be found in 3GPP TS38.331, section 6.3.2.

In one subembodiment of the above embodiment, the time-domain offset indicates an earliest one of the M time windows.

In one subembodiment of the above embodiment, the time-domain offset is measured by millisecond.

In one subembodiment of the above embodiment, the time-domain offset is measured by time-domain unit.

In one subembodiment of the above embodiment, the first information is carried by a DCI signaling.

In one subembodiment of the above embodiment, the first information comprises a Time domain resource assignment field, and the specific meaning of the Time domain resource assignment can be found in 3GPP TS38.212, section 7.3.1.

In one embodiment, the operating action is receiving, and the UE receives a radio signal in each of the M time windows.

In one embodiment, the operating action is transmitting, and the UE selects the first time window by itself out of the M time windows.

In one embodiment, lengths of any two of the M time windows are the same.

In one embodiment, there does not exist a multicarrier symbol belonging to two of the M time windows.

In one embodiment, any of the M time windows comprises at least one consecutive time-domain unit.

In one embodiment, any of the M time windows comprises a time-domain unit.

In one embodiment, numbers of time-domain units comprised in any two of the M time windows are the same.

In one embodiment, the time-domain unit comprises at least one consecutive multicarrier symbol.

In one embodiment, the time-domain unit comprises 14 consecutive multicarrier symbols.

In one embodiment, the time-domain unit comprises 7 consecutive multicarrier symbols.

In one embodiment, the time-domain unit comprises at least one slot.

In one embodiment, the time-domain unit comprises at least one subframe.

In one embodiment, the time-domain unit comprises a slot.

In one embodiment, the time-domain unit comprises a subframe.

In one embodiment, a time gap between any two of the M time windows is an absolute value of a difference value between start times of the two time windows.

In one embodiment, a time gap between any two of the M time windows is an absolute value of a difference value between indexes of start time-domain units of the two time windows.

In one embodiment, a time gap between any two of the M time windows is an absolute value of a difference value between indexes of the two time windows.

In one embodiment, a reference time-domain resource comprises time-domain resources occupied by the first signaling, or a reference time-domain resource comprises time-domain resources occupied by the second time-domain time-frequency resource; time-domain resources occupied by the first time-frequency resource are used by the U02 to determine a target time-domain resource set; and the first condition set comprises that the reference time-domain resources are non-orthogonal to the target time-domain resource set.

In one embodiment, the first condition set comprises that MCSs adopted by the second radio signal and the first radio signal respectively both correspond to a same MCS table.

In one subembodiment of the above embodiment, the first information indicates a first MCS index, an MCS adopted by the first radio signal is an MCS in the MCS table corresponding to the first MCS index, the first signaling indicates a second MCS index, and an MCS adopted by the second radio signal is an MCS in the MCS table corresponding to the second MCS index.

In one embodiment, the first condition set comprises that a time gap between the first signaling and the second radio signal belongs to a first gap set.

In one subembodiment of the above embodiment, the time gap between the first signaling and the second radio signal is a difference value obtained after an index of a time-domain unit to which the second radio signal belongs minus an index of a time-domain unit to which the a first signaling belongs.

In one subembodiment of the above embodiment, the time gap between the first signaling and the second radio signal is a difference value obtained after a start multicarrier symbol of the second radio signal minus a start multicarrier symbol of the first signaling.

In one subembodiment of the above embodiment, the time gap between the first signaling and the second radio signal is a difference value obtained after a start time for transmitting the second radio signal minus a start time for transmitting the first signaling.

In one subembodiment of the above embodiment, the first time gap set comprises at least one value, and the value is measured by time-domain unit.

In one subembodiment of the above embodiment, the first time gap set comprises at least one value, and the value is measured by multicarrier symbol.

In one subembodiment of the above embodiment, the first time gap set comprises at least one value, and the value is measured by millisecond.

In one embodiment, the first condition set comprises that a repetition number of the second radio signal is the same as a repetition number of the first radio signal.

In one subembodiment of the above embodiment, the first radio signal comprises one of a plurality of repetitions of a Transport Block (TB), and the second radio signal is one of a plurality of repetitions of a TB.

In one embodiment, the first condition set comprises N condition(s), N being a positive integer.

In one subembodiment of the above embodiment, N is greater than 1, and one of the N conditions comprises that the reference time-domain resource is non-orthogonal to the target time-domain resource set.

In one subembodiment of the above embodiment, N is equal to 1, and the N condition comprises that the reference time-domain resource is non-orthogonal to the target time-domain resource set.

In one subembodiment of the above embodiment, N is greater than 1, and one of the N conditions comprises that MCSs adopted by the second radio signal and the first radio signal respectively correspond to a same MCS table.

In one subembodiment of the above embodiment, N is equal to 1, and the N condition comprises that MCSs adopted by the second radio signal and the first radio signal respectively correspond to a same MCS table.

In one subembodiment of the above embodiment, N is greater than 1, and one of the N conditions comprises that a time gap between the first signaling and the second radio signal belongs to a first gap set.

In one subembodiment of the above embodiment, N is equal to 1, and the N condition comprises that a time gap between the first signaling and the second radio signal belongs to a first gap set.

In one subembodiment of the above embodiment, N is greater than 1, and one of the N conditions comprises that a repetition number of the second radio signal is the same as a repetition number of the first radio signal.

In one subembodiment of the above embodiment, N is equal to 1, and the N condition comprises that a repetition number of the second radio signal is the same as a repetition number of the first radio signal.

Embodiment 6

Figure 6:
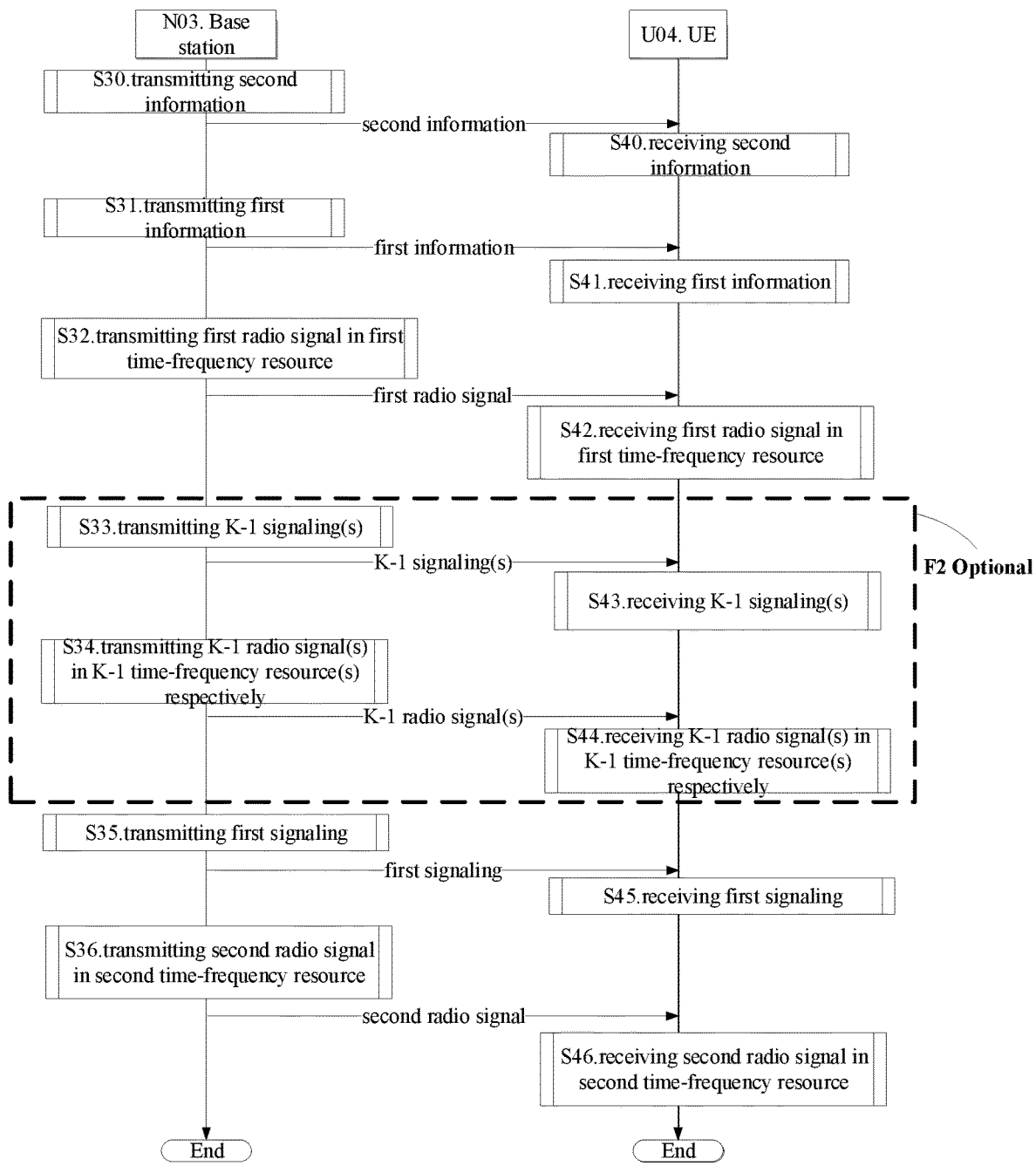
FIG. 6 illustrates a flowchart of wireless transmissions according to another embodiment of the present disclosure.

Embodiment 6 illustrates another flowchart of wireless transmissions, as shown in FIG. 6. In FIG. 6, a base station N03 is a maintenance base station for a serving cell of a UE U04. In FIG. 6, the block marked by F2 is optional.

The N03 transmits second information in step S30; transmits first information in step S31; transmits a first radio signal in a first time-frequency resource in step S32; transmits K−1 signaling(s) in step S33; transmits K−1 radio signal(s) in K−1 time-frequency resource(s) respectively in step S34; transmits a first signaling in step S35; and transmits a second radio signal in a second time-frequency resource in step S36.

The U04 receives second information in step S40; receives first information in step S41; receives a first radio signal in a first time-frequency resource in step S42; receives K−1 signaling(s) in step S43; receives K−1 radio signal(s) in K−1 time-frequency resource(s) respectively in step S44; receives a first signaling in step S45; receives a second radio signal in a second time-frequency resource in step S46.

In embodiment 6, the operating action in the present disclosure is receiving, and the executing action in the present disclosure is transmitting; the first information is used by the U04 to determine a first time-frequency resource and a first parameter group; the first signaling is used by the U04 to determine a second time-frequency resource and a second parameter group; a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group. A start time for transmitting the second information is earlier than a start time for transmitting the first signaling; the second information is used by the U04 to determine M time windows, and any two of the M time windows are orthogonal, M being a positive integer greater than 1; a first time window comprises time-domain resources occupied by the first time-frequency resource, and the first time window is one of the M time windows. A start time for transmitting each of the K signalings is later than a start time for transmitting the first information; the K signalings are respectively used by the U04 to determine K time-frequency resources, and the K signalings are respectively used by the U04 to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s).

Embodiment 7

Figure 7:
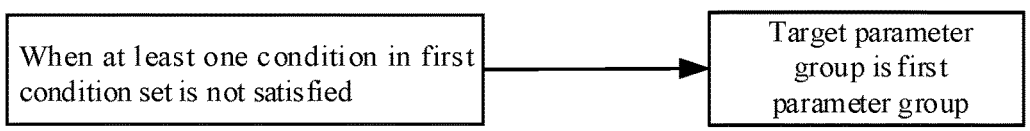
FIG. 7 illustrates a schematic diagram of a first condition set being used to determine a target parameter group out of a first parameter group and a second parameter group according to one embodiment of the present disclosure.

Embodiment 7 illustrates a schematic diagram of a first condition set being used to determine a target parameter group out of a first parameter group and a second parameter group, as shown in FIG. 7.

In embodiment 7, when at least one condition in the first condition set is not satisfied, the target parameter group is the first parameter group; and when all conditions in the first condition set are satisfied, the target parameter group is the second parameter group.

In one embodiment, the first condition set comprises N conditions, N being a positive integer greater than 1; when at least one condition in the first condition set is not satisfied, the target parameter group is the first parameter group; and when all conditions in the first condition set are satisfied, the target parameter group is the second parameter group.

In one embodiment, the first condition set comprises N condition, N being equal to 1; when the first condition set is not satisfied, the target parameter group is the first parameter group; and when the first condition set is not satisfied, the target parameter group is the second parameter group.

Embodiment 8

Figure 8:
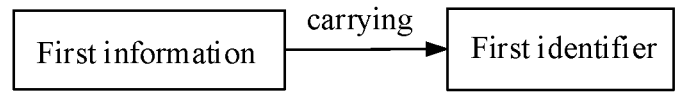
FIG. 8 illustrates a schematic diagram of first information and a first signaling according to one embodiment of the present disclosure.
Figure 8:
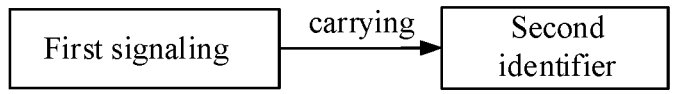

Embodiment 8 illustrates a schematic diagram of first information and a first signaling, as shown in FIG. 8.

In embodiment 8, the first information carries a first identifier, the first signaling carries a second identifier, and the first identifier is different from the second identifier.

In one embodiment, the first identifier and the second identifier are respectively two different non-negative integers.

In one embodiment, the first information comprises all or partial fields in an IE in an RRC signaling, and the first identifier is a name of the IE comprised in the first information.

In one subembodiment of the above embodiment, the operating action is transmitting, the first information comprises part or all of fields of a ConfiguredGrantConfig IE in an RRC signaling, the first identifier is ConfiguredGrant-Config, and the specific meaning of the ConfiguredGrant-Config IE can be found in 3GPP TS38.331, section 6.3.2.

In one embodiment, the first information is carried by a DCI signaling, and the first identifier is a signaling identifier of the DCI signaling carrying the first information.

In one embodiment, the first information is carried by a DCI signaling, and the DCI signaling carrying the first information is a DCI signaling identified by the first identifier.

In one embodiment, the first information is carried by a DCI signaling, and the first identifier is used to generate a Reference Signal (RS) sequence of a DMRS of the DCI signaling carrying the first information.

In one embodiment, the first information is carried by a DCI signaling, and a CRC bit sequence of the DCI signaling carrying the first information is scrambled by the first identifier.

In one embodiment, the first information is carried by a DCI signaling, and the first identifier is a Radio Network Temporary Identifier (RNTI).

In one embodiment, the first information is carried by a DCI signaling, and the first identifier is a Configured Scheduling (CS)-RNTI.

In one embodiment, the second identifier is a signaling identifier of the first signaling In one embodiment, the first signaling is a DCI signaling identified by the second identifier.

In one embodiment, the second identifier is used to generate an RS sequence of a DMRS of the first signaling.

In one embodiment, a CRC bit sequence of the first signaling is scrambled by the second identifier.

In one embodiment, a second identifier is a Cell-Radio Network Temporary Identifier (C-RNTI).

In one embodiment, the second identifier is a new-RNTI, and the specific meaning of the new-RNTI can be found in 3GPP TS38. 214, section 5.1 or section 6.1.

Embodiment 9

Figure 9:
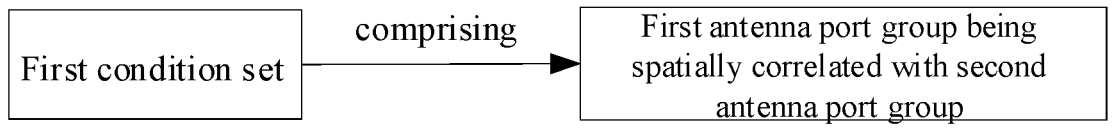
FIG. 9 illustrates a schematic diagram of a first condition set according to one embodiment of the present disclosure.

Embodiment 9 illustrates a schematic diagram of a first condition set, as shown in FIG. 9.

In embodiment 9, a first antenna port group comprises antenna port(s) for transmitting the first radio signal in the present disclosure, and a second antenna port group comprises antenna port(s) for transmitting the second radio signal in the present disclosure; the first condition set comprises that the first antenna port group is spatially correlated with the second antenna port group.

In one embodiment, the first condition set comprises N condition(s), N being a positive integer.

In one subembodiment of the above embodiment, N is greater than 1, and one of the N conditions comprises that the first antenna port group is spatially correlated with the second antenna port group.

In one subembodiment of the above embodiment, N is equal to 1, and the N condition comprises that the first antenna port group is spatially correlated with the second antenna port group.

In one embodiment, the first antenna port group comprises at least one antenna port, and the second antenna port group comprises at least one antenna port.

In one embodiment, the first information also indicates the first antenna port group.

In one embodiment, the first signaling also indicates the second antenna port group.

Embodiment 10

Figure 10:
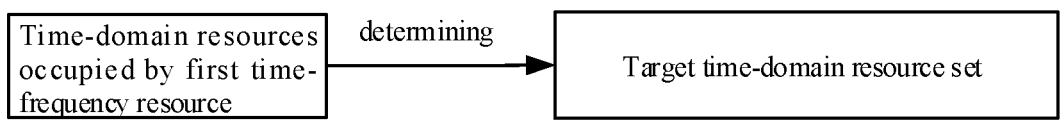
FIG. 10 illustrates a schematic diagram of a first condition set according to another embodiment of the present disclosure.
Figure 10:
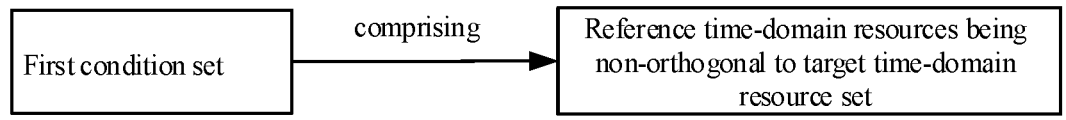

Embodiment 10 illustrates another schematic diagram of a first condition set, as shown in FIG. 10.

In embodiment 10, a reference time-domain resource comprises a time-domain resource occupied by the first signaling in the present disclosure, or, a reference time-domain resource comprises a time-domain resource occupied by the second time-frequency resource in the present disclosure; time-domain resources occupied by the first time-frequency resource in the present disclosure are used to determine a target time-domain resource set; and the first condition set comprises that the reference time-domain resources are non-orthogonal to the target time-domain resource set.

In one embodiment, the first condition set comprises N condition(s), N being a positive integer.

In one subembodiment of the above embodiment, N is greater than 1, and one of the N conditions comprises that the reference time-domain resource is non-orthogonal to the target time-domain resource set.

In one subembodiment of the above embodiment, N is equal to 1, and the N condition comprises that the reference time-domain resource is non-orthogonal to the target time-domain resource set.

In one embodiment, a reference time-domain resource comprises time-domain resources occupied by the first signaling.

In one embodiment, a reference time-domain resource comprises time-domain resources occupied by the second time-frequency resource.

In one embodiment, the reference time-domain resource comprises at least one multicarrier symbol.

In one embodiment, the target time-domain resource set comprises at least one time-domain resource.

In one embodiment, the target time-domain resource set comprises at least one consecutive time-domain resource.

In one embodiment, the target time-domain resource set comprises at least one multicarrier symbol.

In one embodiment, the target time-domain resource set comprises one or a plurality of consecutive multicarrier symbols.

In one embodiment, one multicarrier symbol in the reference time-domain resource belongs to the target time-domain resource set.

In one embodiment, at least one multicarrier symbol in the reference time-domain resource belongs to the target time-domain resource set.

In one embodiment, the reference time-domain resource belongs to the target time-domain resource set.

In one embodiment, the reference time-domain resource and the target time-domain resource set are partially or completely overlapped.

In one embodiment, the target time-domain resource set is predefined.

In one embodiment, the target time-domain resource set is configurable.

In one embodiment, the second information also indicates the target time-domain resource set.

In one embodiment, the second information is also used to indicate the target time-domain resource set.

Embodiment 11

Figure 11:
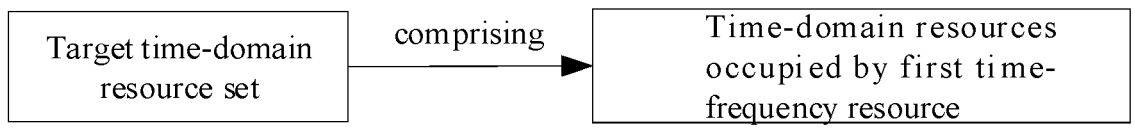
FIG. 11 illustrates a schematic diagram of a relation between a first condition set and a reference time-domain resource according to one embodiment of the present disclosure.
Figure 11:
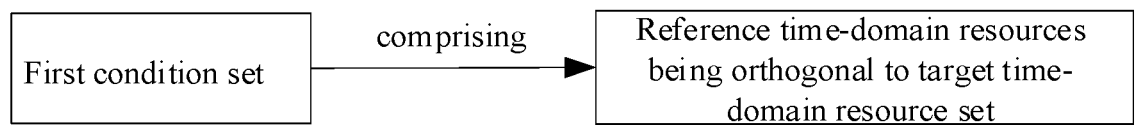

Embodiment 11 illustrates a schematic diagram of a relation of a first condition set and a reference time-domain resource, as shown in FIG. 11.

In embodiment 11, a target time-domain resource set comprises time-domain resources occupied by the first time-frequency resource in the present disclosure, and the first condition set comprises that the reference time-domain resource is non-orthogonal to the target time-domain resource set.

In one embodiment, the first condition set comprises N condition(s), N being a positive integer.

In one subembodiment of the above embodiment, N is greater than 1, one of the N conditions comprises that the reference time-domain resource is non-orthogonal to the target time-domain resource set, and the target time-domain resource set comprises time-domain resources occupied by the first time-frequency resource.

In one subembodiment of the above embodiment, N is equal to 1, the N condition comprises that the reference time-domain resource is non-orthogonal to the target time-domain resource set, and the target time-domain resource set comprises time-domain resources occupied by the first time-frequency resource.

In one embodiment, the reference time-domain resource and the target time-domain resource set are overlapped.

In one embodiment, one multicarrier symbol in the reference time-domain resource belongs to the target time-domain resource set.

In one embodiment, at least one multicarrier symbol in the reference time-domain resource belongs to the target time-domain resource set.

In one embodiment, the reference time-domain resource belongs to the target time-domain resource set.

In one embodiment, the reference time-domain resource comprises a first sub-time-domain resource and a second sub-time-domain resource, the first sub-time-domain resource belongs to the target time-domain resource set, and the second sub-time-domain resource is orthogonal to the target time-domain resource set.

In one subembodiment of the above embodiment, any multicarrier symbol in the second sub-time-domain resource does not belong to the target time-domain resource set.

Embodiment 12

Figure 12:
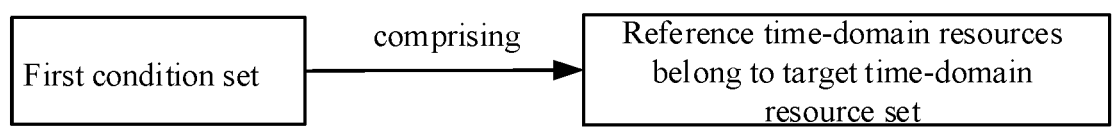
FIG. 12 illustrates a schematic diagram of a relation between a first condition set and a reference time-domain resource according to another embodiment of the present disclosure.

Embodiment 12 illustrates another schematic diagram of a relation of a first condition set and a reference time-domain resource, as shown in FIG. 12.

In embodiment 12, the first condition set comprises that the reference time-domain resource belongs to the target time-domain resource set in the present disclosure.

In one embodiment, the first condition set comprises N condition(s), N being a positive integer.

In one subembodiment of the above embodiment, N is greater than 1, and one of the N conditions comprises that the reference time-domain resource belongs to the target time-domain resource set.

In one subembodiment of the above embodiment, N is equal to 1, and the N condition comprises that the reference time-domain resource belongs to the target time-domain resource set.

In one embodiment, the target time-domain resource set comprises at least one time-domain unit.

In one embodiment, the target time-domain resource set comprises at least one consecutive time-domain unit.

In one embodiment, the target time-domain resource set comprises at least one multicarrier symbol.

In one embodiment, the target time-domain resource set comprises at least one consecutive multicarrier symbol.

In one embodiment, the target time-domain resource set comprises a multicarrier symbol not belonging to time-domain resources occupied by the first time-frequency resource.

In one embodiment, the target time-domain resource set comprises time-domain resources occupied by the first time-frequency resource and a multicarrier symbol not belonging to the time-domain resources occupied by the first time-frequency resource.

In one embodiment, the target time-domain resource set comprises at least one consecutive multicarrier symbol, and a first time-domain offset is an absolute value of a time offset between a start multicarrier symbol of the target time-domain resource set and time-domain resources occupied by the first time-domain resource.

In one subembodiment of the above embodiment, the time offset between a start multicarrier symbol of the target time-domain resource set and time-domain resources occupied by the first time-frequency resource is a difference value obtained after an index of a start multicarrier symbol of the target time-domain resource set minus an index of a start multicarrier symbol of the first time-frequency resource.

In one subembodiment of the above embodiment, the time offset between a start multicarrier symbol of the target time-domain resource set and time-domain resources occupied by the first time-frequency resource is a difference value obtained after an index of a start multicarrier symbol of the target time-domain resource set minus an index of a terminal multicarrier symbol of the first time-frequency resource.

In one subembodiment of the above embodiment, the first time-domain offset is predefined.

In one subembodiment of the above embodiment, the first time-domain offset is configurable.

In one subembodiment of the above embodiment, the first time-domain offset is indicated by the second information.

In one subembodiment of the above embodiment, the first time-domain offset is measured by millisecond.

In one subembodiment of the above embodiment, the first time-domain offset is measured by multicarrier symbol.

In one embodiment, the target time-domain resource set comprises at least one consecutive multicarrier symbol, and a second time-domain offset is an absolute value of a time offset between a terminal multicarrier symbol of the target time-domain resource set and time-domain resources occupied by the first time-frequency resource.

In one subembodiment of the above embodiment, the time offset between a terminal multicarrier symbol of the target time-domain resource set and time-domain resources occupied by the first time-frequency resource is a difference value obtained after an index of a terminal multicarrier symbol of the target time-domain resource set minus an index of a start multicarrier symbol of the first time-frequency resource.

In one subembodiment of the above embodiment, the time offset between a terminal multicarrier symbol of the target time-domain resource set and time-domain resources occupied by the first time-frequency resource is a difference value obtained after an index of a terminal multicarrier symbol of the target time-domain resource set minus an index of a terminal multicarrier symbol of the first time-frequency resource.

In one subembodiment of the above embodiment, the second time-domain offset is predefined.

In one subembodiment of the above embodiment, the second time-domain offset is configurable.

In one subembodiment of the above embodiment, the second time-domain offset is indicated by the second information.

In one subembodiment of the above embodiment, the second time-domain offset is measured by millisecond.

In one subembodiment of the above embodiment, the second time-domain offset is measured by multicarrier symbol.

In one embodiment, the target time-domain resource set comprises at least one consecutive time-domain unit, and a third time-domain offset is an absolute value of a time offset between a start time-domain unit of the target time-domain resource set and time-domain resources occupied by the first time-frequency resource.

In one subembodiment of the above embodiment, time-domain resources occupied by the first time-frequency resource belong to a time-domain unit, and the time offset between a start time-domain unit of the target time-domain resource set and time-domain resources occupied by the first time-frequency resource is a difference value obtained after an index of a start time-domain unit of the target time-domain resource set minus an index of a time-domain unit of time-domain resources occupied by the first time-frequency resource.

In one subembodiment of the above embodiment, time-domain resources occupied by the first time-frequency resource belong to a time-domain unit, and a terminal time-domain unit of the target time-domain resource set is a time-domain unit of the time-domain resources occupied by the first time-frequency resource.

In one subembodiment of the above embodiment, time-domain resources occupied by the first time-frequency resource belong to a time-domain unit, a terminal time-domain unit of the target time-domain resource set is a time-domain unit earlier than a time-domain unit comprising the time-domain resources occupied by the first time-frequency resource, and a difference value obtained after an index of the time-domain unit of the time-domain resource occupied by the first time-frequency resource minus an index of a terminal time-domain unit of the target time-domain resource set is equal to 1.

In one subembodiment of the above embodiment, time-domain resources occupied by the first time-frequency resource belong to a time-domain unit, a terminal time-domain unit of the target time-domain resource set is a time-domain unit earlier than a time-domain unit comprising the time-domain resources occupied by the first time-frequency resource, and a difference value obtained after an index of the time-domain unit of the time-domain resource occupied by the first time-frequency resource minus an index of a terminal time-domain unit of the target time-domain resource set is equal to a first difference value, and the first difference value is predefined or configurable.

In one subembodiment of the above embodiment, time-domain resources occupied by the first time-frequency resource belong to a plurality of time-domain units, and the time offset between a start time-domain unit of the target time-domain resource set and time-domain resources occupied by the first time-frequency resource is a difference value obtained after an index of a start time-domain unit of the target time-domain resource set minus an index of a start time-domain unit occupied by the first time-frequency resource.

In one subembodiment of the above embodiment, time-domain resources occupied by the first time-frequency resource belong to a plurality of time-domain units, and the time offset between a start time-domain unit of the target time-domain resource set and time-domain resources occupied by the first time-frequency resource is a difference value obtained after an index of a start time-domain unit of the target time-domain resource set minus an index of a terminal time-domain unit occupied by the first time-frequency resource.

In one subembodiment of the above embodiment, time-domain resources occupied by the first time-frequency resource belong to a plurality of time-domain units, and a terminal time-domain unit of the target time-domain resource set is a start time-domain unit of the first time-frequency resource.

In one subembodiment of the above embodiment, time-domain resources occupied by the first time-frequency resource belong to a plurality of time-domain units, a terminal time-domain unit of the target time-domain resource set is earlier than a start time-domain unit of the first time-frequency resource, and a difference value obtained after an index of the start time-domain unit of the first time-frequency resource minus an index of a terminal time-domain unit of the target time-domain resource set is equal to 1.

In one subembodiment of the above embodiment, time-domain resources occupied by the first time-frequency resource belong to a plurality of time-domain units, a terminal time-domain unit of the target time-domain resource set is earlier than a start time-domain unit of the first time-frequency resource, and a difference value obtained after an index of the start time-domain unit of the first time-frequency resource minus an index of a terminal time-domain unit of the target time-domain resource set is equal to a second difference value, and the second difference value is predefined or configurable.

In one subembodiment of the above embodiment, the third time-domain offset is predefined.

In one subembodiment of the above embodiment, the third time-domain offset is configurable.

In one subembodiment of the above embodiment, the third time-domain offset is indicated by the second information.

In one subembodiment of the above embodiment, the third time-domain offset is measured by millisecond.

In one subembodiment of the above embodiment, the third time-domain offset is measured by time-domain unit.

In one embodiment, the target time-domain resource set comprises at least one consecutive time-domain unit, and a fourth time-domain offset is an absolute value of a time offset between a terminal time-domain unit of the target time-domain resource set and time-domain resources occupied by the first time-frequency resource.

In one subembodiment of the above embodiment, time-domain resources occupied by the first time-frequency resource belong to a time-domain unit, and the time offset between a terminal time-domain unit of the target time-domain resource set and time-domain resources occupied by the first time-frequency resource is a difference value obtained after an index of a terminal time-domain unit of the target time-domain resource set minus an index of a time-domain unit of time-domain resources occupied by the first time-frequency resource.

In one subembodiment of the above embodiment, time-domain resources occupied by the first time-frequency resource belong to a plurality of time-domain units, and the time offset between a terminal time-domain unit of the target time-domain resource set and time-domain resources occupied by the first time-frequency resource is a difference value obtained after an index of a terminal time-domain unit of the target time-domain resource set minus an index of a start time-domain unit occupied by the first time-frequency resource.

In one subembodiment of the above embodiment, time-domain resources occupied by the first time-frequency resource belong to a plurality of time-domain units, and the time offset between a terminal time-domain unit of the target time-domain resource set and time-domain resources occupied by the first time-frequency resource is a difference value obtained after an index of a terminal time-domain unit of the target time-domain resource set minus an index of a terminal time-domain unit occupied by the first time-frequency resource.

In one subembodiment of the above embodiment, time-domain resources occupied by the first time-frequency resource belong to a time-domain unit, and a terminal time-domain unit of the target time-domain resource set is a time-domain unit comprising the time-domain resources occupied by the first time-frequency resource.

In one subembodiment of the above embodiment, time-domain resources occupied by the first time-frequency resource belong to a plurality of time-domain units, and a terminal time-domain unit of the target time-domain resource set is a start time-domain unit of the first time-frequency resource.

In one subembodiment of the above embodiment, the fourth time-domain offset is equal to one time-domain unit.

In one subembodiment of the above embodiment, the fourth time-domain offset is predefined.

In one subembodiment of the above embodiment, the fourth time-domain offset is configurable.

In one subembodiment of the above embodiment, the fourth time-domain offset is measured by millisecond.

In one subembodiment of the above embodiment, the fourth time-domain offset is measured by time-domain unit.

Embodiment 13

Figure 13:
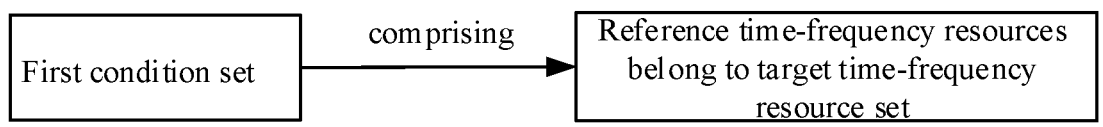
FIG. 13 illustrates a schematic diagram of a relation between a first condition set and a reference time-domain resource according to another embodiment of the present disclosure.

Embodiment 13 illustrates another schematic diagram of a relation of a first condition set and a reference time-domain resource, as shown in FIG. 13.

In embodiment 13, the reference time-frequency resource comprises time-frequency resources occupied by the first signaling, or, the reference time-frequency resource comprises the second time-frequency resource in the present disclosure; the first condition set comprises that the reference time-frequency resource belongs to the target time-frequency resource set in the present disclosure.

In one embodiment, the target time-frequency resource set comprises at least one time-frequency resource.

In one embodiment, the target time-frequency resource set is predefined.

In one embodiment, the target time-frequency resource set is configurable.

In one embodiment, the target time-frequency resource set is indicated by the second information.

In one embodiment, the first time-frequency resource is used to determine the target time-frequency resource set.

In one embodiment, the reference time-frequency resource comprises time-frequency resources occupied by the first signaling.

In one embodiment, the reference time-frequency resource comprises the second time-frequency resource.

In one embodiment, any time-frequency resource comprised in the target time-frequency resource set comprises at least one multicarrier symbol in time domain.

In one embodiment, any time-frequency resource comprised in the target time-frequency resource set comprises one or a plurality of multicarrier symbols in time domain.

In one embodiment, any time-frequency resource comprised in the target time-frequency resource set comprises at least one subcarrier in frequency domain.

In one embodiment, a number of subcarriers comprised in any time-frequency resource comprised in the target time-frequency resource set in frequency domain is equal to a positive integral multiple of 12.

In one embodiment, any time-frequency resource comprised in the target time-frequency resource set comprises at least one RB in frequency domain.

Embodiment 14

Figure 14:
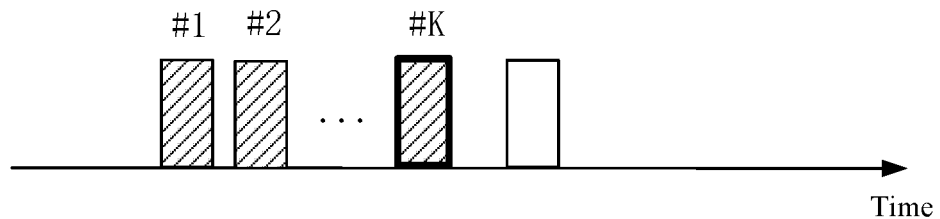
FIG. 14 illustrates a schematic diagram of relations among a first signaling and K signalings according to one embodiment of the present disclosure.
Figure 15A:
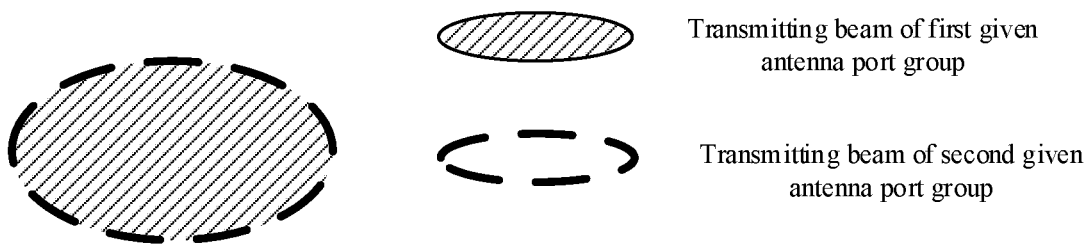
FIGS. 15A-15C respectively illustrate a schematic diagram of a first given antenna port group being spatially correlated with a second given antenna group according to one embodiment of the present disclosure.
Figure 15B:
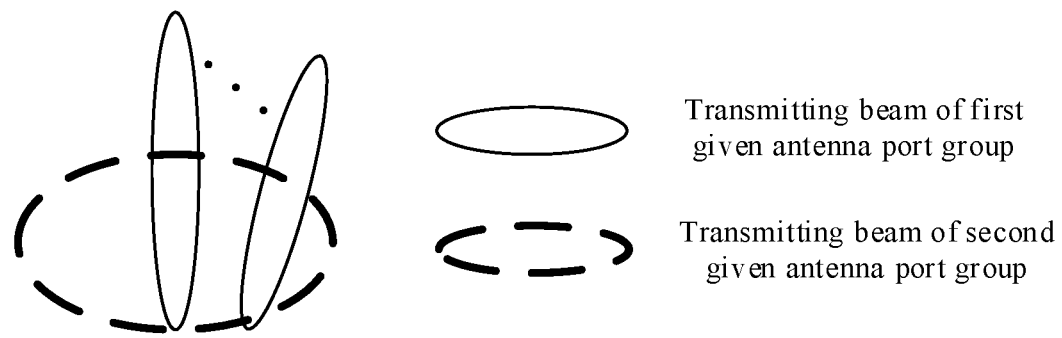
Figure 15C:
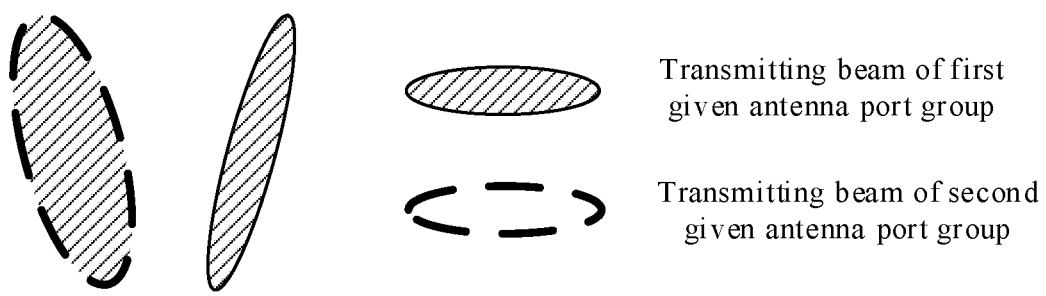

Embodiment 14 illustrates a schematic diagram of relations among a first signaling and K signalings, as shown in FIG. 14.

In embodiment 14, the target parameter group in the present disclosure is the second parameter group in the present disclosure, the first signaling is any of the K signalings, each of the K signalings satisfies the first condition set in the present disclosure, and the first signaling is one of the K signalings whose start time is latest to the first time-frequency resource in the present disclosure; K is a positive integer greater than 1.

Embodiment 15

Embodiments 15A to 15C illustrate schematic diagrams of a first given antenna port group being spatially correlated with a second given antenna port group respectively.

In embodiment 15, the first given antenna port group corresponds to the first antenna port group in the present disclosure, and the second given antenna port group corresponds to the second antenna port group in the present disclosure.

In one embodiment, the first given antenna port group being spatially correlated with the second given antenna port group includes: the second given antenna port group comprises all antenna ports in the first given antenna port group.

In one embodiment, the first given antenna port group being spatially correlated with the second given antenna port group includes: a transmitting or receiving antenna or antenna group of a transmitting radio signal on the second given antenna port group comprises all transmitting or receiving antennas or antenna groups of a transmitting radio signal on the first given antenna port group.

In one embodiment, the first given antenna port group being spatially correlated with the second given antenna port group includes: a transmitting antenna or antenna group of a transmitting radio signal on the second given antenna port group comprises all transmitting antennas or antenna groups of a transmitting radio signal on the first given antenna port group.

In one embodiment, the first given antenna port group being spatially correlated with the second given antenna port group includes: a receiving antenna or antenna group of a transmitting radio signal on the second given antenna port group comprises all receiving antennas or antenna groups of a transmitting radio signal on the first given antenna port group.

In one embodiment, the first given antenna port group being spatially correlated with the second given antenna port group includes: a transmitting antenna or antenna group of a transmitting radio signal on the second given antenna port group comprises all receiving antennas or antenna groups of a transmitting radio signal on the first given antenna port group.

In one embodiment, the first given antenna port group being spatially correlated with the second given antenna port group includes: a receiving antenna or antenna group of a transmitting radio signal on the second given antenna port group comprises all transmitting antennas or antenna groups of a transmitting radio signal on the first given antenna port group.

In one embodiment, the first given antenna port group being spatially correlated with the second given antenna port group includes: a second antenna group is one or a plurality of antenna groups that generate a multi-antenna associated transmission or multi-antenna associated reception of a transmitting radio signal on the second given antenna port group, a first antenna group is one or a plurality of antenna groups that generate a multi-antenna associated transmission or multi-antenna associated reception of a transmitting radio signal on the first given antenna port group, and the second antenna group comprises all antennas or antenna groups in the first antenna group.

In one embodiment, the first given antenna port group being spatially correlated with the second given antenna port group includes: a second antenna group is one or a plurality of antenna groups that generate a multi-antenna associated transmission of a transmitting radio signal on the second given antenna port group, a first antenna group is one or a plurality of antenna groups that generate a multi-antenna associated transmission of a transmitting radio signal on the first given antenna port group, and the second antenna group comprises all antennas or antenna groups in the first antenna group.

In one embodiment, the first given antenna port group being spatially correlated with the second given antenna port group includes: a second antenna group is one or a plurality of antenna groups that generate a multi-antenna associated reception of a transmitting radio signal on the second given antenna port group, a first antenna group is one or a plurality of antenna groups that generate a multi-antenna associated reception of a transmitting radio signal on the first given antenna port group, and the second antenna group comprises all antennas or antenna groups in the first antenna group.

In one embodiment, the first given antenna port group being spatially correlated with the second given antenna port group includes: a second antenna group is one or a plurality of antenna groups that generate a multi-antenna associated transmission of a transmitting radio signal on the second given antenna port group, a first antenna group is one or a plurality of antenna groups that generate a multi-antenna associated reception of a transmitting radio signal on the first given antenna port group, and the second antenna group comprises all antennas or antenna groups in the first antenna group.

In one embodiment, the first given antenna port group being spatially correlated with the second given antenna port group includes: the second given antenna port group comprises partial antenna ports in the first given antenna port group, and any antenna port in the first given antenna port group not belonging to the second given antenna port group and at least one antenna port in the second given antenna port are Quasi Co-Located (QCL).

In one embodiment, the first given antenna port group being spatially correlated with the second given antenna port group includes: the second given antenna port group comprises partial antenna ports in the first given antenna port group, and any antenna port in the first given antenna port group not belonging to the second given antenna port group and one antenna port in the second given antenna port are QCL.

In one embodiment, the first given antenna port group being spatially correlated with the second given antenna port group includes: the second given antenna port group comprises partial antenna ports in the first given antenna port group, and any antenna port in the first given antenna port group not belonging to the second given antenna port group and at least one antenna port in the second given antenna port are spatially QCL.

In one embodiment, the first given antenna port group being spatially correlated with the second given antenna port group includes: the second given antenna port group comprises partial antenna ports in the first given antenna port group, and any antenna port in the first given antenna port group not belonging to the second given antenna port group and one antenna port in the second given antenna port are spatially QCL.

In one embodiment, the first given antenna port group being spatially correlated with the second given antenna port group includes: any antenna port in the first given antenna port group and at least one antenna port in the second given antenna port group are QCL.

In one embodiment, the first given antenna port group being spatially correlated with the second given antenna port group includes: any antenna port in the first given antenna port group and one antenna port in the second given antenna port group are QCL.

In one embodiment, the first given antenna port group being spatially correlated with the second given antenna port group includes: any antenna port in the first given antenna port group and at least one antenna port in the second given antenna port group are spatially QCL.

In one embodiment, the first given antenna port group being spatially correlated with the second given antenna port group includes: any antenna port in the first given antenna port group and one antenna port in the second given antenna port group are spatially QCL.

In one embodiment, the first given antenna port group being spatially correlated with the second given antenna port group includes: at least one antenna port in the first given antenna port group cannot transmit a radio signal simultaneously with at least one antenna port in the second given antenna port group.

In one embodiment, the first given antenna port group being spatially correlated with the second given antenna port group includes: a transmission or reception of a radio signal on at least one antenna port in the first given antenna port group and a transmission or reception of a radio signal on at least one antenna port in the second given antenna port group cannot be executed at the same time.

In one embodiment, the first given antenna port group being spatially correlated with the second given antenna port group includes: a reception of a transmitting radio signal on at least one antenna port in the first given antenna port group and a reception of a transmitting radio signal on at least one antenna port in the second given antenna port group cannot be executed at the same time.

In one embodiment, the first given antenna port group being spatially correlated with the second given antenna port group includes: a transmission of a radio signal on at least one antenna port in the first given antenna port group and a reception of a transmitting radio signal on at least one antenna port in the second given antenna port group cannot be executed at the same time.

In one embodiment, the first given antenna port group being spatially correlated with the second given antenna port group includes: a transmission of a radio signal on at least one antenna port in the second given antenna port group and a reception of a transmitting radio signal on at least one antenna port in the first given antenna port group cannot be executed at the same time.

In one embodiment, the first given antenna port group being spatially correlated with the second given antenna port group includes: any antenna port in the first given antenna port group cannot transmit a radio signal simultaneously with at least one antenna port in the second given antenna port group.

In one embodiment, the first given antenna port group being spatially correlated with the second given antenna port group includes: a transmission or reception of a radio signal on any antenna port in the first given antenna port group and a transmission or reception of a radio signal on at least one antenna port in the second given antenna port group cannot be executed at the same time.

In one embodiment, the first given antenna port group being spatially correlated with the second given antenna port group includes: a reception of a transmitting radio signal on any antenna port in the first given antenna port group and a reception of a transmitting radio signal on at least one antenna port in the second given antenna port group cannot be executed at the same time.

In one embodiment, the first given antenna port group being spatially correlated with the second given antenna port group includes: a transmission of a radio signal on any antenna port in the first given antenna port group and a reception of a transmitting radio signal on at least one antenna port in the second given antenna port group cannot be executed at the same time.

In one embodiment, the first given antenna port group being spatially correlated with the second given antenna port group includes: a transmission of a radio signal on at least one antenna port in the second given antenna port group and a reception of a transmitting radio signal on any antenna port in the first given antenna port group cannot be executed at the same time.

In one embodiment, the first given antenna port group being spatially correlated with the second given antenna port group includes: a transmitting or receiving antenna or antenna group of a transmitting antenna signal on the second given antenna port group comprises at least one transmitting or receiving antenna or antenna group of a transmitting radio signal on the first given antenna port group.

In one embodiment, the first given antenna port group being spatially correlated with the second given antenna port group includes: a transmitting antenna or antenna group of a radio signal on the second given antenna port group comprises at least one transmitting antenna or antenna group of a radio signal on the first given antenna port group.

In one embodiment, the first given antenna port group being spatially correlated with the second given antenna port group includes: a receiving antenna or antenna group of a transmitting radio signal on the second given antenna port group comprises at least one receiving antenna or antenna group of a transmitting radio signal on the first given antenna port group.

In one embodiment, the first given antenna port group being spatially correlated with the second given antenna port group includes: a transmitting antenna or antenna group of a transmitting radio signal on the second given antenna port group comprises at least one receiving antenna or antenna group of a transmitting radio signal on the first given antenna port group.

In one embodiment, the first given antenna port group being spatially correlated with the second given antenna port group includes: a receiving antenna or antenna group of a transmitting radio signal on the second given antenna port group comprises at least one transmitting antenna or antenna group of a transmitting radio signal on the first given antenna port group.

In one embodiment, the first given antenna port group being spatially correlated with the second given antenna port group includes: a second antenna group is one or a plurality of antenna groups that generate a multi-antenna associated transmission or multi-antenna associated reception of a transmitting radio signal on the second given antenna port group, a first antenna group is one or a plurality of antenna groups that generate a multi-antenna associated transmission or multi-antenna associated reception of a transmitting radio signal on the first given antenna port group, and the second antenna group comprises at least one antenna or antenna group in the first antenna group.

In one embodiment, the first given antenna port group being spatially correlated with the second given antenna port group includes: a second antenna group is one or a plurality of antenna groups that generate a multi-antenna associated transmission of a transmitting radio signal on the second given antenna port group, a first antenna group is one or a plurality of antenna groups that generate a multi-antenna associated transmission of a transmitting radio signal on the first given antenna port group, and the second antenna group comprises at least one antenna or antenna group in the first antenna group.

In one embodiment, the first given antenna port group being spatially correlated with the second given antenna port group includes: a second antenna group is one or a plurality of antenna groups that generate a multi-antenna associated reception of a transmitting radio signal on the second given antenna port group, a first antenna group is one or a plurality of antenna groups that generate a multi-antenna associated reception of a transmitting radio signal on the first given antenna port group, and the second antenna group comprises at least one antenna or antenna group in the first antenna group.

In one embodiment, the first given antenna port group being spatially correlated with the second given antenna port group includes: a second antenna group is one or a plurality of antenna groups that generate a multi-antenna associated transmission of a transmitting radio signal on the second given antenna port group, a first antenna group is one or a plurality of antenna groups that generate a multi-antenna associated reception of a transmitting radio signal on the first given antenna port group, and the second antenna group comprises at least one antenna or antenna group in the first antenna group.

In one embodiment, the first given antenna port group being spatially correlated with the second given antenna port group includes: a second antenna group is one or a plurality of antenna groups that generate a multi-antenna associated reception of a transmitting radio signal on the second given antenna port group, a first antenna group is one or a plurality of antenna groups that generate a multi-antenna associated transmission of a transmitting radio signal on the first given antenna port group, and the second antenna group comprises at least one antenna or antenna group in the first antenna group.

In one embodiment, the first given antenna port group being spatially correlated with the second given antenna port group includes: the second given antenna port group comprises at least one antenna port in the first given antenna port group.

In one embodiment, the first given antenna port group being spatially correlated with the second given antenna port group includes: at least one antenna port in the first given antenna port group and at least one antenna port in the second given antenna port group are QCL.

In one embodiment, the first given antenna port group being spatially correlated with the second given antenna port group includes: at least one antenna port in the first given antenna port group and at least one antenna port in the second given antenna port group are spatially QCL.

In one embodiment, two antenna ports being QCL refers to: all or partial large-scale properties of a radio signal transmitted on one of the two antenna ports can be used for inferring all or partial large-scale properties of a radio signal transmitted on the other of the two antenna ports.

In one embodiment, two antenna ports being QCL refers to: the two antenna ports at least have a same QCL parameter, and the QCL parameter comprises a multi-antenna relevant QCL parameter and a multi-antenna irrelevant QCL parameter.

In one embodiment, two antenna ports being QCL refers to: at least one QCL parameter of one of the two antenna ports can be used for inferring at least one QCL parameter of the other of the two antenna port.

In one embodiment, two antenna ports being QCL refers to: a multi-antenna associated reception of a radio signal transmitted on one of the two antenna ports can be used for inferring a multi-antenna associated reception of a radio signal transmitted on the other of the two antenna ports.

In one embodiment, two antenna ports being QCL refers to: a multi-antenna associated transmission of a radio signal transmitted on one of the two antenna ports can be used for inferring a multi-antenna associated transmission of a radio signal transmitted on the other of the two antenna ports.

In one embodiment, two antenna ports being QCL refers to: a multi-antenna associated transmission of a radio signal transmitted on one of the two antenna ports can be used for inferring a multi-antenna associated reception of a radio signal transmitted on the other of the two antenna ports, and a receiver of the radio signal transmitted on one of the two antenna ports is the same as a transmitter of the radio signal transmitted on the other of the two antenna ports.

In one embodiment, a multi-antenna relevant QCL parameter comprises: one or more of an angle of arrival, an angle of departure, spatial correlation, a multi-antenna associated transmission and a multi-antenna associated reception.

In one embodiment, a multi-antenna irrelevant QCL parameter comprises: one or more of a delay spread, a Doppler spread, a Doppler shift, a path loss and an average gain.

In one embodiment, two antenna ports being spatially QCL refers to: all or partial multi-antenna relevant large-scale properties of a radio signal transmitted by one of the two antenna ports can be used for inferring all or partial multi-antenna relevant large-scale properties of a radio signal transmitted by the other of the two antenna ports.

In one embodiment, two antenna ports being spatially QCL refers to: the two antenna ports at least have a same multi-antenna relevant spatial QCL parameter.

In one embodiment, two antenna ports being spatially QCL refers to: at least one multi-antenna relevant QCL parameter of one of the two antenna ports can be used for inferring at least one multi-antenna relevant QCL parameter of the other of the two antenna ports.

In one embodiment, two antenna ports being spatially QCL refers to: a multi-antenna associated reception of a radio signal transmitted on one of the two antenna ports can be used for inferring a multi-antenna associated reception of a radio signal transmitted on the other of the two antenna ports.

In one embodiment, two antenna ports being spatially QCL refers to: a multi-antenna associated transmission of a radio signal transmitted on one of the two antenna ports can be used for inferring a multi-antenna associated transmission of a radio signal transmitted on the other of the two antenna ports.

In one embodiment, two antenna ports being spatially QCL refers to: a multi-antenna associated transmission of a radio signal transmitted on one of the two antenna ports can be used for inferring a multi-antenna associated reception of a radio signal transmitted on the other of the two antenna ports, and a receiver of the radio signal transmitted on one of the two antenna ports is the same as a transmitter of the radio signal transmitted on the other of the two antenna ports.

In one embodiment, multi-antenna relevant large-scale properties of a given radio signal comprise one or more of an angle of arrival, an angle of departure, a spatial correlation, a multi-antenna associated transmission and a multi-antenna associated reception.

In one embodiment, the multi-antenna associated reception refers to Spatial Rx parameters.

In one embodiment, the multi-antenna associated reception refers to a receiving beam.

In one embodiment, the multi-antenna associated reception refers to a reception beamforming matrix.

In one embodiment, the multi-antenna associated reception refers to a reception analog beamforming matrix.

In one embodiment, the multi-antenna associated reception refers to a reception beamforming vector.

In one embodiment, the multi-antenna associated reception refers to reception spatial filtering.

In one embodiment, the multi-antenna associated transmission refers to Spatial Tx parameters.

In one embodiment, the multi-antenna associated transmission refers to a transmission beam.

In one embodiment, the multi-antenna associated transmission refers to a transmission beamforming matrix.

In one embodiment, the multi-antenna associated transmission refers to a transmission analog beamforming matrix.

In one embodiment, the multi-antenna associated transmission refers to a transmission beamforming vector.

In one embodiment, the multi-antenna associated transmission refers to transmission spatial filtering.

In one embodiment, the Embodiment 15A corresponds to a schematic diagram of the first given antenna port group being spatially correlated with the second given antenna port group in which a transmitting beam of the first given antenna port group is the same as a transmitting beam of the second given antenna port group.

In one embodiment, the Embodiment 15B corresponds to a schematic diagram of the first given antenna port group being spatially correlated with the second given antenna port group in which a transmitting beam of the second given antenna port group is the same as a transmitting beam of the first given antenna port group.

In one embodiment, the Embodiment 15C corresponds to a schematic diagram of the first given antenna port group being spatially correlated with the second given antenna port group in which a transmitting beam of the second given antenna port group comprises partial transmitting beams of the first given antenna port group.

Embodiment 16

Figure 16:
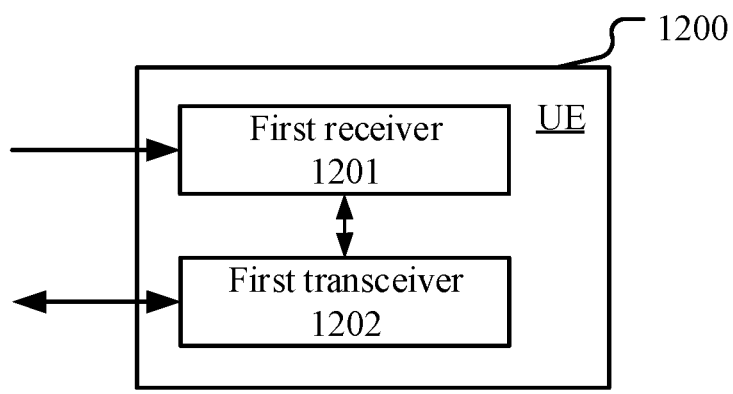
FIG. 16 illustrates a structure block diagram of a processing device in a UE according to one embodiment of the present disclosure.

Embodiment 16 illustrates a structure block diagram of a processing device in a UE, as shown in FIG. 16. In FIG. 16, a UE processing device 1200 consists of a first receiver 1201 and a first transceiver 1202.

In one embodiment, the first receiver 1201 comprises the receiver 456, the receiving processor 452, the first processor 441 and the controller/processor 490 in Embodiment 4.

In one embodiment, the first receiver 1201 comprises at least first three of the receiver 456, the receiving processor 452, the first processor 441 and the controller/processor 490 in Embodiment 4.

In one embodiment, the first receiver 1201 comprises at least first two of the receiver 456, the receiving processor 452, the first processor 441 and the controller/processor 490 in Embodiment 4.

In one embodiment, the first transceiver 1202 comprises the transmitter/receiver 456, the receiving processor 452, the transmitting processor 455, the first processor 441 and the controller/processor 490 in Embodiment 4.

In one embodiment, the first transceiver 1202 comprises at least first four of the transmitter/receiver 456, the receiving processor 452, the transmitting processor 455, the first processor 441 and the controller/processor 490 in Embodiment 4.

In one embodiment, the first transceiver 1202 comprises at least first three of the transmitter/receiver 456, the receiving processor 452, the transmitting processor 455, the first processor 441 and the controller/processor 490 in Embodiment 4.

In one embodiment, the first transceiver 1202 comprises at least first two of the transmitter/receiver 456, the receiving processor 452, the transmitting processor 455, the first processor 441 and the controller/processor 490 in Embodiment 4.

A first receiver 1201 receives first information, the first information is used to determine a first time-frequency resource and a first parameter group; receives a first signaling, and the first signaling is used to determine a second time-frequency resource and a second parameter group; a first transceiver 1202 operates a first radio signal in the first time-frequency resource; and operates a second radio signal in the second time-frequency resource;

In embodiment 16, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the operating action is transmitting, or the operating action is receiving.

In one embodiment, when at least one condition in the first condition set is not satisfied, the target parameter group is the first parameter group; and when all conditions in the first condition set are satisfied, the target parameter group is the second parameter group.

In one embodiment, the first information carries a first identifier, the first signaling carries a second identifier, and the first identifier is different from the second identifier.

In one embodiment, the first receiver 1201 also receives second information; herein, a start time for transmitting the second information is earlier than a start time for transmitting the first signaling; the second information is used to determine M time windows, and any two of the M time windows are orthogonal, M being a positive integer greater than 1; a first time window comprises time-domain resources occupied by the first time-frequency resource, and the first time window is one of the M time windows.

In one embodiment, a first antenna port group comprises antenna port(s) for transmitting the first radio signal, and a second antenna port group comprises antenna port(s) for transmitting the second radio signal; and the first condition set comprises that the first antenna port group is spatially correlated with the second antenna port group.

In one embodiment, reference time-domain resources comprise time-domain resources occupied by the first signaling, or, reference time-domain resources comprise time-domain resources occupied by the second time-frequency resource; time-domain resources occupied by the first time-frequency resource are used to determine a target time-domain resource set; and the first condition set comprises that the reference time-domain resources are non-orthogonal to the target time-domain resource set.

In one embodiment, the target parameter group is the second parameter group, the first signaling is any of K signalings, each of the K signalings satisfies the first condition set, and the first signaling is one of the K signalings whose start time is latest to the first time-frequency resource; K is a positive integer greater than 1.

In one embodiment, the first receiver 1201 also receives K−1 signaling(s); the first transceiver 1202 also operates K−1 radio signal(s) in K−1 time-frequency resource(s) respectively; herein, a start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s); the operating action is transmitting, or the operating action is receiving.

Embodiment 17

Figure 17:
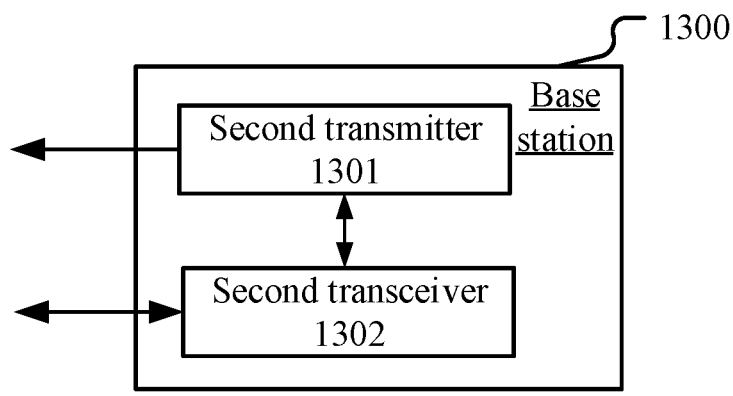
FIG. 17 illustrates a structure block diagram of a processing device in a base station according to one embodiment of the present disclosure.

Embodiment 17 illustrates a structure block diagram of a processing device in a base station, as shown in FIG. 17. In FIG. 17, a processing device 1300 in a base station consists of a second transmitter 1301 and a second transceiver 1302.

In one embodiment, the second transmitter 1301 comprises the transmitter 416, the transmitting processor 415, the first processor 471 and the controller/processor 440 in Embodiment 4.

In one embodiment, the second transmitter 1301 comprises at least first three of the transmitter 416, the transmitting processor 415, the first processor 471 and the controller/processor 440 in Embodiment 4.

In one embodiment, the second transmitter 1301 comprises at least first two of the transmitter 416, the transmitting processor 415, a first processor and the controller/processor 440 in Embodiment 4.

In one subembodiment, the second transceiver 1302 comprises the transmitter/receiver 416, the transmitting processor 415, the receiving processor 412, the first processor 471 and the controller/processor 440 in Embodiment 4.

In one subembodiment, the second transceiver 1302 comprises at least first four of the transmitter/receiver 416, the transmitting processor 415, the receiving processor 412, the first processor 471 and the controller/processor 440 in Embodiment 4.

In one subembodiment, the second transceiver 1302 comprises at least first three of the transmitter/receiver 416, the transmitting processor 415, the receiving processor 412, the first processor 471 and the controller/processor 440 in Embodiment 4.

In one subembodiment, the second transceiver 1302 comprises at least first two of the transmitter/receiver 416, the transmitting processor 415, the receiving processor 412, the first processor 471 and the controller/processor 440 in Embodiment 4.

A second transmitter 1301 transmits the first information, and the first information is used to determine a first time-frequency resource and a first parameter group; transmits a first signaling, and the first signaling is used to determine a second time-frequency resource and a second parameter group;

a second transceiver 1302 executes a first radio signal in the first time-frequency resource; and executes a second radio signal in the second time-frequency resource;

In embodiment 17, a start time for transmitting the first signaling is later than a start time for transmitting the first information; the second parameter group is used to generate the second radio signal, a target parameter group is used to generate the first radio signal, and the target parameter group is the first parameter group or the second parameter group; a first condition set is used to determine the target parameter group out of the first parameter group and the second parameter group; the executing action is receiving, or, the executing action is transmitting.

In one embodiment, when at least one condition in the first condition set is not satisfied, the target parameter group is the first parameter group; and when all conditions in the first condition set are satisfied, the target parameter group is the second parameter group.

In one embodiment, the first information carries a first identifier, the first signaling carries a second identifier, and the first identifier is different from the second identifier.

In one embodiment, the second transmitter 1301 also transmits second information; herein, a start time for transmitting the second information is earlier than a start time for transmitting the first signaling; the second information is used to determine M time windows, and any two of the M time windows are orthogonal, M being a positive integer greater than 1; a first time window comprises time-domain resources occupied by the first time-frequency resource, and the first time window is one of the M time windows.

In one embodiment, a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

In one embodiment, reference time-domain resources comprise time-domain resources occupied by the first signaling, or, reference time-domain resources comprise time-domain resources occupied by the second time-frequency resource; time-domain resources occupied by the first time-frequency resource are used to determine a target time-domain resource set; and the first condition set comprises that the reference time-domain resources are non-orthogonal to the target time-domain resource set.

In one embodiment, the target parameter group is the second parameter group, the first signaling is any of K signalings, each of the K signalings satisfies the first condition set, and the first signaling is one of the K signalings whose start time is latest to the first time-frequency resource; K is a positive integer greater than 1.

In one embodiment, the second transmitter 1301 also transmits K−1 signaling(s); the second transceiver 1302 executes K−1 radio signal(s) in K−1 time-frequency resource(s) respectively; herein, a start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s); the executing action is receiving, or, the executing action is transmitting.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:
    a first receiver, receiving first information, the first information being used to determine a first time-frequency resource and a first parameter group; receiving a first signaling, the first signaling being used to determine a second time-frequency resource and a second parameter group; and
    a first transceiver, receiving a first radio signal in the first time-frequency resource, and receiving a second radio signal in the second time-frequency resource; wherein;
    the first signaling is a DCI signaling, a start time for transmitting the first signaling is later than a start time for transmitting the first information;
    the second parameter group is used to generate the second radio signal, a target parameter group is used to generate the first radio signal, and the target parameter group is the first parameter group or the second parameter group; the first parameter group comprises a TCI, and the second parameter group comprises a TCI;
    a first condition set is used to determine the target parameter group out of the first parameter group and the second parameter group;
    the first condition set comprises N conditions, N being a positive integer greater than 1;
    a target time-domain resource set comprises time-domain resources occupied by the first time-frequency resource;
    one of the N conditions comprises that a reference time-domain resource is non-orthogonal to the target time-domain resource set, wherein the reference time-domain resource comprises time-domain resources occupied by the second time-frequency resource; and
    one of the N conditions comprises that a time gap between the first signaling and the second radio signal belongs to a first gap set.

2. The UE according to claim 1, wherein when at least one condition in the first condition set is not satisfied, the target parameter group is the first parameter group; and
    when all conditions in the first condition set are satisfied, the target parameter group is the second parameter group.

3. The UE according to claim 1, wherein the first information carries a first identifier, the first signaling carries a second identifier, and the first identifier is different from the second identifier.

4. The UE according to claim 1, wherein a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

5. The UE according to claim 1, wherein:
    the target parameter group is the second parameter group, the first signaling is any of K signalings, each of the K signalings satisfies the first condition set, and the first signaling is one of the K signalings whose start time is latest to the first time-frequency resource; K is a positive integer greater than 1;
    or, the first receiver also receives K−1 signaling(s); the first transceiver also receives K−1 radio signal(s) in K−1 time-frequency resource(s) respectively; wherein the target parameter group is the second parameter group, the first signaling is any of K signalings, each of the K signalings satisfies the first condition set, and the first signaling is one of the K signalings whose start time is latest to the first time-frequency resource; K is a positive integer greater than 1; a start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s).

6. A base station for wireless communications, comprising:
    a second transmitter, transmitting first information, the first information being used to determine a first time-frequency resource and a first parameter group; transmitting a first signaling, the first signaling being used to determine a second time-frequency resource and a second parameter group; and
    a second transceiver, transmitting a first radio signal in the first time-frequency resource, and transmitting a second radio signal in the second time-frequency resource;
    wherein the first signaling is a DCI signaling, a start time for transmitting the first signaling is later than a start time for transmitting the first information; the second parameter group is used to generate the second radio signal, a target parameter group is used to generate the first radio signal, and the target parameter group is the first parameter group or the second parameter group; the first parameter group comprises a TCI, and the second parameter group comprises a TCI; a first condition set is used to determine the target parameter group out of the first parameter group and the second parameter group;
    the first condition set comprises N conditions, N being a positive integer greater than 1;
    a target time-domain resource set comprises time-domain resources occupied by the first time-frequency resource, and one of the N conditions comprises that a reference time-domain resource is non-orthogonal to the target time-domain resource set, wherein the reference time-domain resource comprises time-domain resources occupied by the second time-frequency resource;

one of the N conditions comprises that a time gap between the first signaling and the second radio signal belongs to a first gap set.

7. The base station according to claim 6, wherein when at least one condition in the first condition set is not satisfied, the target parameter group is the first parameter group;

and when all conditions in the first condition set are satisfied, the target parameter group is the second parameter group;

or, the first information carries a first identifier, the first signaling carries a second identifier, and the first identifier is different from the second identifier.

8. The base station according to claim 6, wherein a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

9. A method in a UE for wireless communications, comprising:

receiving first information, the first information being used to determine a first time-frequency resource and a first parameter group;

receiving a first signaling, the first signaling being used to determine a second time-frequency resource and a second parameter group;

receiving a first radio signal in the first time-frequency resource, and receiving a second radio signal in the second time-frequency resource;

wherein the first signaling is a DCI signaling, a start time for transmitting the first signaling is later than a start time for transmitting the first information; the second parameter group is used to generate the second radio signal, a target parameter group is used to generate the first radio signal, and the target parameter group is the first parameter group or the second parameter group;

the first parameter group comprises a TCI, and the second parameter group comprises a TCI;

a first condition set is used to determine the target parameter group out of the first parameter group and the second parameter group;

the first condition set comprises N conditions, N being a positive integer greater than 1;

a target time-domain resource set comprises time-domain resources occupied by the first time-frequency resource;

one of the N conditions comprises that a reference time-domain resource is non-orthogonal to the target time-domain resource set, wherein the reference time-domain resource comprises time-domain resources occupied by the second time-frequency resource; and one of the N conditions comprises that a time gap between the first signaling and the second radio signal belongs to a first gap set.

10. The method in a UE according to claim 9, wherein when at least one condition in the first condition set is not satisfied, the target parameter group is the first parameter group; and when all conditions in the first condition set are satisfied, the target parameter group is the second parameter group.

11. The method in a UE according to claim 9, wherein the first information carries a first identifier, the first signaling carries a second identifier, and the first identifier is different from the second identifier.

12. The method in a UE according to claim 9, wherein a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

13. The method in a UE according to claim 9, wherein the target parameter group is the second parameter group, the first signaling is any of K signalings, each of the K signalings satisfies the first condition set, and the first signaling is one of the K signalings whose start time is latest to the first time-frequency resource; K is a positive integer greater than 1;

or, the method further comprises: receiving K−1 signaling(s); and receiving K−1 radio signal(s) in K−1 time-frequency resource(s) respectively; wherein the target parameter group is the second parameter group, the first signaling is any of K signalings, each of the K signalings satisfies the first condition set, and the first signaling is one of the K signalings whose start time is latest to the first time-frequency resource; K is a positive integer greater than 1; A start time for transmitting each of the K signalings is later than a start time for transmitting the first information; the K signalings are respectively used to determine K time-frequency resources, and the K signalings are respectively used to determine K parameter groups; the second time-frequency resource is one of the K time-frequency resources, and the second parameter group is one of the K parameter groups; the K−1 signalings(s) is(are) composed of signaling(s) other than the first signaling in the K signalings, and the K−1 time-frequency resource(s) is(are respectively) time-frequency resource(s) in the K time-frequency resources determined by the K−1 signaling(s); K−1 parameter group(s) is(are respectively) parameter group(s) in the K parameter groups determine by the K−1 signaling(s), and the K−1 parameter group(s) is(are respectively) used to generate the K−1 radio signal(s).

14. A method in a base station for wireless communications, comprising:

transmitting first information, the first information being used to determine a first time-frequency resource and a first parameter group;

transmitting a first signaling, the first signaling being used to determine a second time-frequency resource and a second parameter group;

transmitting a first radio signal in the first time-frequency resource, and transmitting a second radio signal in the second time-frequency resource;

wherein the first signaling is a DCI signaling, a start time for transmitting the first signaling is later than a start time for transmitting the first information; the second parameter group is used to generate the second radio signal, a target parameter group is used to generate the first radio signal, and the target parameter group is the first parameter group or the second parameter group;

the first parameter group comprises a TCI, and the second parameter group comprises a TCI;

a first condition set is used to determine the target parameter group out of the first parameter group and the second parameter group;

the first condition set comprises N conditions, N being a positive integer greater than 1;

a target time-domain resource set comprises time-domain resources occupied by the first time-frequency resource;

one of the N conditions comprises that a reference time-domain resource is non-orthogonal to the target time-domain resource set, wherein the reference time-domain resource comprises time-domain resources occupied by the second time-frequency resource; and one of the N conditions comprises that a time gap between the first signaling and the second radio signal belongs to a first gap set.

15. The method in a base station according to claim 14, wherein when at least one condition in the first condition set is not satisfied, the target parameter group is the first parameter group; and when all conditions in the first condition set are satisfied, the target parameter group is the second parameter group;

or, the first information carries a first identifier, the first signaling carries a second identifier, and the first identifier is different from the second identifier.

16. The method in a base station according to claim 14, wherein a first antenna port group comprises antenna port(s) for transmitting the first radio signal, and a second antenna port group comprises antenna port(s) for transmitting the second radio signal; the first condition set comprises that the first antenna port group is spatially correlated with the second antenna port group.

* * * * *